US011310742B2

(12) United States Patent
Nam et al.

(10) Patent No.: US 11,310,742 B2
(45) Date of Patent: Apr. 19, 2022

(54) METHODS AND APPARATUS TO FACILITATE MULTIPLEXING WAKE-UP SIGNALS WITH OTHER RESOURCES

(71) Applicant: QUALCOMM Incorporated, San Diego, CA (US)

(72) Inventors: Wooseok Nam, San Diego, CA (US); Peter Pui Lok Ang, San Diego, CA (US); Olufunmilola Omolade Awoniyi-Oteri, San Diego, CA (US); Tao Luo, San Diego, CA (US); Gabi Sarkis, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 16/791,255

(22) Filed: Feb. 14, 2020

(65) Prior Publication Data
US 2020/0288401 A1 Sep. 10, 2020

Related U.S. Application Data

(60) Provisional application No. 62/813,709, filed on Mar. 4, 2019.

(51) Int. Cl.
H04W 52/02 (2009.01)
H04L 5/00 (2006.01)
H04W 72/04 (2009.01)

(52) U.S. Cl.
CPC ....... H04W 52/0235 (2013.01); H04L 5/0048 (2013.01); H04W 52/0216 (2013.01);
(Continued)

(58) Field of Classification Search
CPC ............ H04W 52/0235; H04W 52/02; H04W 52/0216; H04W 52/0248; H04W 72/042; H04L 5/0048
(Continued)

(56) References Cited

U.S. PATENT DOCUMENTS

2014/0349646 A1 11/2014 Su et al.
2017/0280473 A1 9/2017 Krishnamoorthy et al.
(Continued)

FOREIGN PATENT DOCUMENTS

CN 110831121 A 2/2020
WO 2018175760 A1 9/2018

OTHER PUBLICATIONS

Ericsson: "Maintenance Issues for Wake-Up Signal for Rel-15 LTE-MTC", 3GPP TSG-RAN WG1 Meeting #94bis, R1-1811533, 3rd Generation Partnership Project (3GPP), Mobile Competence Centre, 650, Route Des Lucioles, F-06921 Sophia-Antipolis, vol. RAN WG1, No. Chengdu. P.R. China,Oct. 8-Oct. 12, 2018, Sep. 29, 2018, XP051518934, 2 Pages, Retrieved from the Internet: URL:http://www.3gpp.org/ftp/tsg%5Fran/WG1%5FRL1/TSGR1%5F94b/Docs/R1%2D1811533%2Ezip [retrieved on Sep. 29, 2018] Section 2.1, p. 1.
(Continued)

Primary Examiner — Rownak Islam
(74) Attorney, Agent, or Firm — Procopio, Cory, Hargreaves & Savitch LLP

(57) ABSTRACT

A UE receives a first indication of a Wake-Up Signal (WUS) resource for another UE. The UE identifies a conflict between a resource allocated to the UE and the WUS resource for the other UE based on the first indication. The UE modifies communication with a base station in the resource in response to the identifying of the conflict. A base station identifies a conflict between a resource for commu-
(Continued)

nication with a first UE and a WUS for another UE and modifies the communication with the first UE in the resource in response to identifying the conflict.

30 Claims, 18 Drawing Sheets

(52) U.S. Cl.
CPC ..... *H04W 52/0248* (2013.01); *H04W 72/042* (2013.01); *H04W 52/02* (2013.01)
(58) Field of Classification Search
USPC .......................................................... 370/311
See application file for complete search history.

(56) References Cited

U.S. PATENT DOCUMENTS

| | | |
|---|---|---|
| 2019/0058516 A1 | 2/2019 | Yang et al. |
| 2019/0239189 A1* | 8/2019 | Hwang ............. H04W 52/0229 |
| 2020/0029302 A1* | 1/2020 | Cox ................. H04W 56/0015 |
| 2020/0053647 A1 | 2/2020 | Chae et al. |
| 2020/0229092 A1* | 7/2020 | Wu ....................... H04W 76/11 |

OTHER PUBLICATIONS

Huawei., et al., "Updated Feature Lead Summary of Wake-up Signal Configurations and Procedures in NB-IoT", R1-1807560, 3rd Generation partnership project (3GPP), Mobile Competence Centre, 650, Route Des Lucioles, F-06921, Sophia-Antipolis Cedex, France, vol. RAN WG1, No. Busan, Korea, May 21-May 25, 2018, May 24, 2018, 19 pages, Retrieved from the Internet: URL: http://www.3gpp.org/ftp/tsg%5Fran/WG1%5FRL1/TSGR1%5F93/Docs [retrieved on May 24, 2018] the whole document, p. 16, Paragraph 4.5—p. 19, Proposal 3 from Vivo, p. 10.

Intel Corporation: "Configurations of Wake-Up Signal for feNB-IoT", 3GPP Draft, 3GPP TSG RAN WG1 Meeting #93, R1-1806492, 3rd Generation Partnership Project (3GPP), Mobile Competence Centre, 650, Route Des Lucioles, F-06921 Sophia-Antipolis Cedex, France, vol. RAN WG1, No. Busan, Korea, May 21-May 25, 2018, May 20, 2018 (May 20, 2018), XP051441694, 5 Pages, Retrieved from the Internet: URL:http://www.3gpp.org/ftp/Meetings%5F3GPP%5FSYNC/RAN1/Docs/ [retrieved on May 20, 2018] Section 2.1, p. 1, section 2.2, p. 2-p. 3.

International Search Report and Written Opinion—PCT/US2020/018669—ISA/EPO—May 8, 2020.

Vivo: "Summary of UE power Consumption Reduction in RRM Measurements", 3GPP TSG RAN WG1 Meeting #95, R1-1814028_7.2.9.3, 3rd Generation Partnership Project (3GPP), Mobile Competence Centre, 650, Route Des Lucioles, F-06921, Sophia-Antipolis Cedex, France, vol. RAN WG1, No. Spokane, USA, Nov. 12-Nov. 16, 2018, Nov. 19, 2018, XP051494472, pp. 1-18, Retrieved from the Internet: URL:http://www.3gpp.org/ftp/tsg%5Fran/WG1%5FRL1/TSGR1%5F95/Docs/R1%2D1814028%2Ezip [retrieved on Nov. 19, 2018] pp. 9-11, Paragraph 2.2.

\* cited by examiner

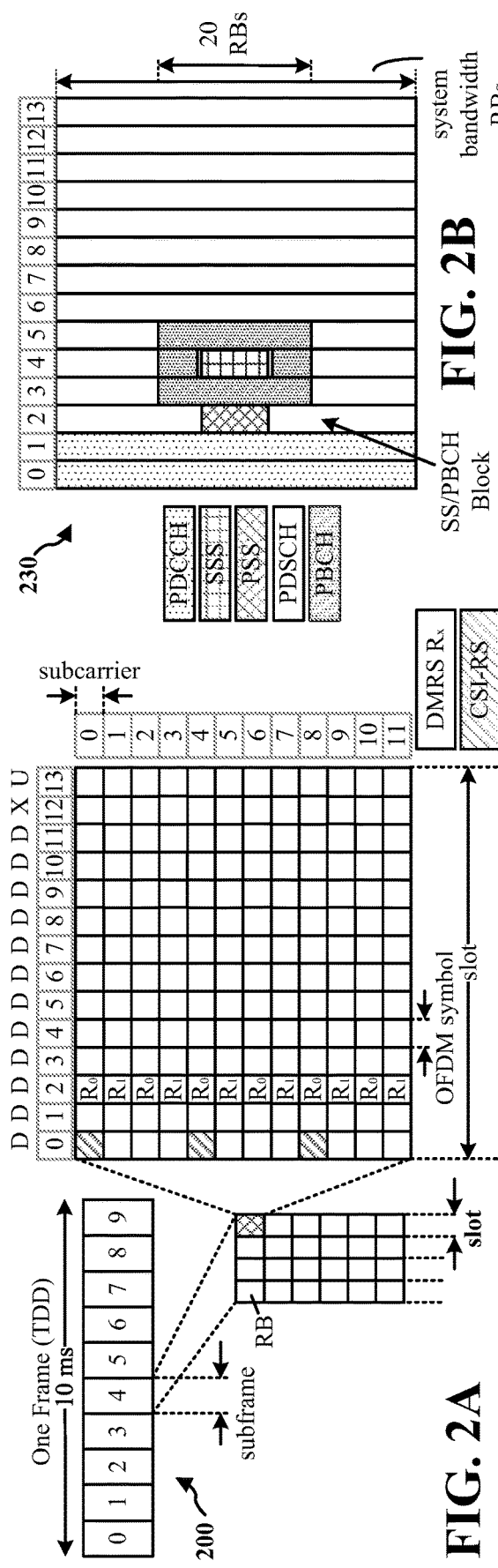
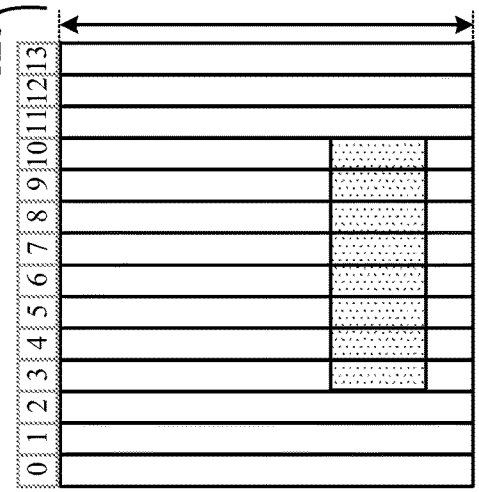
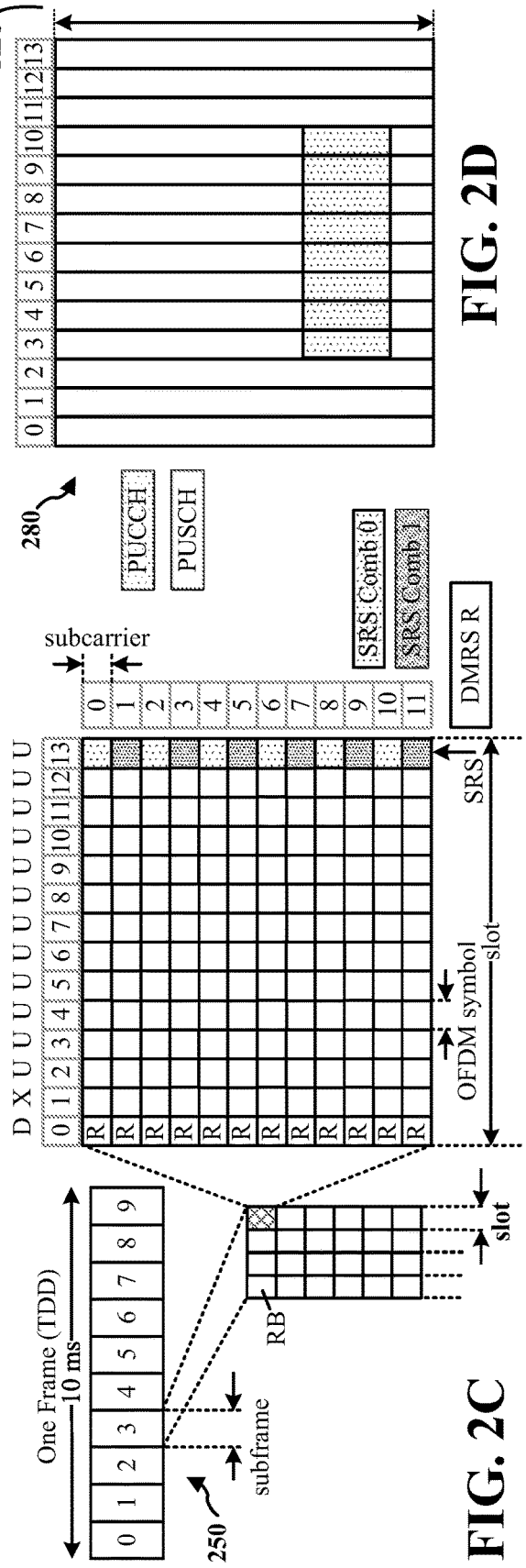
FIG. 2A  FIG. 2B  FIG. 2C  FIG. 2D

METHODS AND APPARATUS TO FACILITATE MULTIPLEXING WAKE-UP SIGNALS WITH OTHER RESOURCES

CROSS REFERENCE TO RELATED APPLICATION(S)

This application claims the benefit of U.S. Patent Provisional Application Ser. No. 62/813,709, entitled "METHODS AND APPARATUS TO FACILITATE MULTIPLEXING WAKE-UP SIGNALS WITH OTHER RESOURCES" and filed on Mar. 4, 2019, which is expressly incorporated by reference herein in its entirety.

BACKGROUND

Technical Field

The present disclosure relates generally to communication systems, and more particularly, to wireless communication involving wake-up signals.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. An example apparatus for wireless communication at a UE that receives a first indication of a Wake-Up Signal (WUS) resource for another UE. The example apparatus identifies a conflict between a resource allocated to the UE and the WUS resource for the other UE based on the first indication. The example apparatus modifies communication with a base station in the resource in response to the identifying of the conflict.

In another aspect of the disclose, a method, a computer-readable medium, and an apparatus are provided. An example apparatus for wireless communication at a UE identifies a conflict between a system resource and a WUS resource associated with the UE while the UE is operating based on discontinuous reception (DRX). The example apparatus modifies DRX operation in response to the identifying of the conflict between the system resource and the WUS resource.

In another aspect of the disclosure, a method, a computer-readable medium, and an apparatus are provided. An example apparatus for wireless communication at a base station identifies a conflict between a resource for communication with a first UE and a WUS for another UE. The apparatus modifies the communication with the first UE in the resource in response to identifying the conflict.

In another aspect of the disclosure, a method, a computer-readable medium, and an apparatus are provided. An example apparatus for wireless communication at a base station identifies a conflict between a system resource and a WUS resource for the UE operating based on DRX. The apparatus modifies a transmission to the UE in response to identifying the conflict between the system resource and the WUS resource.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
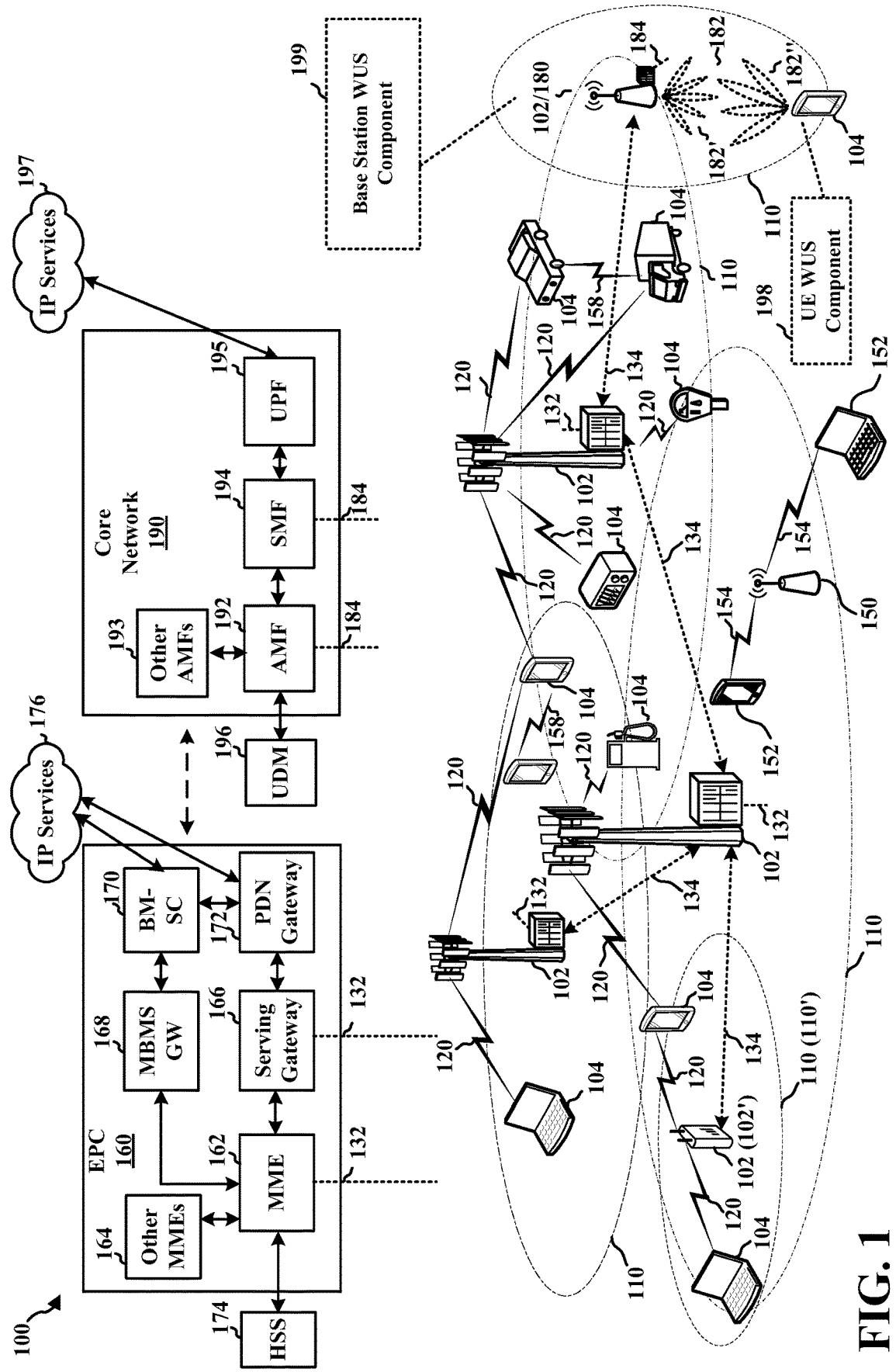
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, the term "computer-readable medium" is expressly defined to include any type of computer readable storage device and/or storage disk and to exclude propagating signals and to exclude transmission media. As used herein, the terms "computer-readable medium," "machine-readable medium," "computer-readable memory," and "machine-readable memory" are used interchangeably.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to manage one or more aspects of wireless communication via multiplexing of WUS resources with other resources. For example, the UE 104 of FIG. 1 includes a UE WUS component 198 configured to address collisions between resources for WUSs and resources for other communication (e.g., for dedicated resources for a UE or for system resources). In an example, the UE WUS component 198 may be configured to receive a first indication of a WUS resource for another UE. The UE WUS component 198 may also be configured to identify a conflict between a resource associated with the UE and the WUS resource for the other UE based on the first indication. Further, the UE WUS component 198 may be configured to modify communication in the resource in response to the identifying of the conflict.

In another example, the UE WUS component 198 may be configured to identify a conflict between a system resource and a WUS resource associated with the UE while the UE is operating in a DRX state. The UE WUS component 198 may also be configured to modify receipt of the WUS resource in response to the identifying of the conflict.

Referring still to FIG. 1, in certain aspects, the base station 180 may be configured to manage one or more aspects of wireless communication via facilitating multiplexing of WUS resources with other resources. For example, the base station 180 of FIG. 1 includes a base station WUS component 199 configured to facilitate addressing collisions between resources for WUSs and resources for other communication (e.g., for dedicated resources for a UE or for system resources). In an example, the base station WUS component 199 may be configured to transmit, to a UE, a first indication of a WUS resource for another UE. The base station WUS component 199 may also be configured to transmit, to the UE, a communication in a resource associated with the UE, wherein the resource is identified as a conflicting resource with the WUS resource based on the first indication and receipt of the communication is modified based on the identifying of the conflicting resource.

In another aspect, the base station WUS component 199 may be configured to transmit, to a UE, a WUS resource associated with the UE while the UE is operating in a DRX state, wherein the WUS resource is in conflict with a system resource, and wherein receipt, at the UE, of the WUS resource is modified in response to the conflict.

Although the following description is focused on downlink communications, the concepts described herein may be applicable to uplink communications and/or sidelink communications. Furthermore, although the following description may be focused on 5G/NR, the concepts described herein may be applicable to other similar areas, such as LTE, LTE-A, CDMA, GSM, and/or other wireless technologies, in which a WUS resource may conflict with a dedicated resource associated with the UE or a system resource (e.g., a shared resource) associated with a plurality of UEs.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC- FDMA) symbols) (for power limited scenarios; limited to a single stream transmission). The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
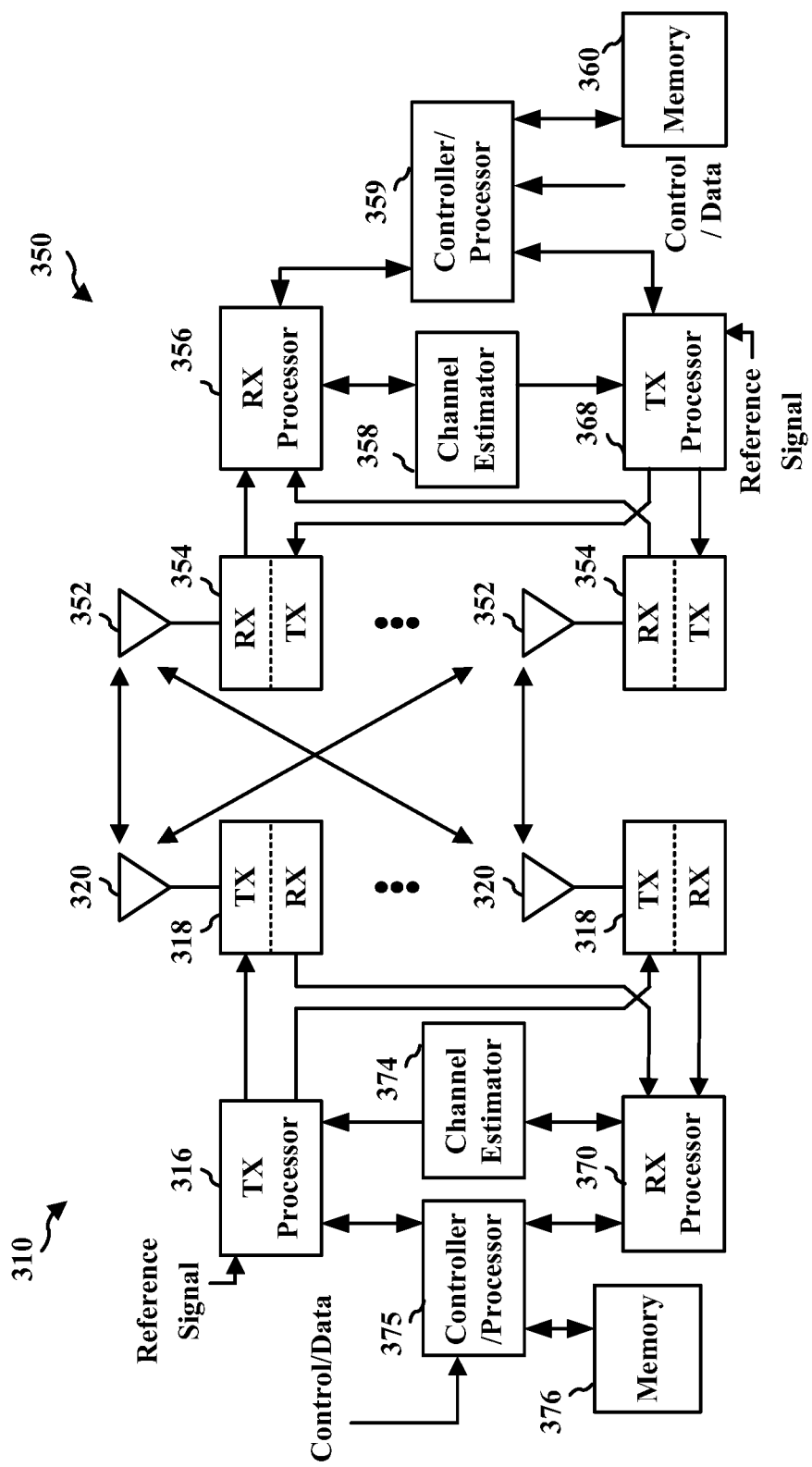
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate-matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the UE WUS component 198 of FIG. 1.

At least one of the TX processor 316, the RX processor 370, and the controller/processor 375 may be configured to perform aspects in connection with the base station WUS component 199 of FIG. 1.

When operating in DRX, a UE may wake up during a period, such as a paging occasion, to monitor for a page from the network. If no page is received, following the paging occasion, the UE may transition to a sleep mode or lower power mode until a next paging occasion. Wake-up signals may be used to facilitate improved power efficiency during discontinuous reception operation. For example, employing WUSs during DRX operation may reduce the chances of unnecessary wake-ups by a device, such as the UE 104 of FIG. 1. For example, while the UE is operating in a DRX cycle, the UE may receive a WUS indicating that there is data scheduled for the UE during a DRX-On state of the DRX cycle. Detection of the WUS may cause the UE to wake up to receive the communication. If the WUS is not detected, the UE may return to a sleep state, the UE may then transition back to a sleep state rather than staying in an awake state for the duration of the DRX-On state of the DRX cycle.

A WUS may be transmitted on resources in time and/or frequency that may be referred to herein as a "WUS resource." In some examples, an instance of a WUS resource may be referred to as a WUS monitoring occasion.

Different types of signals can be used for a WUS. For example, a WUS may be based on a reference-signal, such as a channel state information reference signal (CSI-RS), a tracking reference signal (TRS), a demodulation reference signal (DMRS), etc. In some examples, the WUS may be comprised in a control channel, such as a physical downlink control channel (PDCCH). In some examples, the WUS may comprise a particular sequence, such as a pseudo-random (PN) sequence, a gold sequence, a Zadoff-chu (ZC) sequence, etc.

In some examples, resources for a WUS transmission may be configured for each DRX UE (e.g., a UE operating in a DRX cycle) served by a base station. In some such examples, each of the respective DRX UEs may monitor the configured resources to detect the respective WUS as a part of their DRX cycle. However, in some examples, a WUS may be transmitted in a same resource dedicated to another UE and/or shared by other UEs. In some such examples, the UE may modify the receipt of a communication in and/or around the resource to facilitate decreasing the impact of a collision (e.g., between the WUS resource and the dedicated resource/system resource). In some examples, different adjustments may be applied based on the type of signals having the potential for collision with the WUS.

As used herein, a dedicated resource is a resource (e.g., a time and/or frequency) that is scheduled for a particular UE (e.g., specific to a UE). Dedicated resources may be used for UEs that are not in a DRX state and/or UEs that are in an awake state (sometimes referred to herein as an "ON state") during the DRX-On state of a DRX cycle. In some examples, a dedicated resource may be used to transmit data transmissions or control transmissions to the UE, such as a PDCCH, a physical downlink shared channel (PDSCH), a physical uplink control channel (PUCCH), a physical uplink shared channel (PUSCH), etc. In some examples, a dedicated resource may be used to transmit reference signals to the UE, such as a CSI-RS, a phase TRS (PTRS), a tracking-RS, etc.

As used herein, a system resource is a resource (e.g., a time and/or frequency) that is shared by all or a group of UEs. Examples of system resources include synchronization signal blocks (SSBs), physical broadcast channel (PBCH) blocks, broadcast signals including a system information block (SIB), broadcast signals including Other System Information (OSI), broadcast signals including Remaining Minimum System Information (RMSI), group-specific reference signals, and statically-reserved resources (or semi-statically reserved resources), among others.

While the examples illustrated in FIGS. 4 to 6B are directed to downlink communications, the techniques disclosed herein may additionally or alternatively be applied to uplink communications. For example, in time division duplex (TDD), a time slot is assigned a direction of communication (e.g., uplink or downlink), which is indicated in a semi-static configuration from the network (e.g., the base station) to the UE. If a time slot is marked for a downlink communication, then a WUS resource may collide in that respective time slot with a dedicated resource or a system resource, and the UE may operate as described below in connection with FIGS. 4 and 5. If a time slot is marked for an uplink communication, then a WUS resource may collide in that respective time slot with a dedicated resource or a system, and the UE may operate as described below in connection with FIG. 5. However, since the base station is assigning the direction of communication for the respective time slot and the transmittal of the WUS, a collision between a WUS resource and an uplink communication may be unlikely to occur.

Furthermore, in frequency division duplex (FDD), since different bandwidths are used for uplink transmissions and downlink transmissions, there may be a likelihood of a collision between a WUS resource and a downlink communication (as described below in connection with FIG. 4), and there might not be a likelihood of a collision between a WUS resource and an uplink communication.

Figure 4:
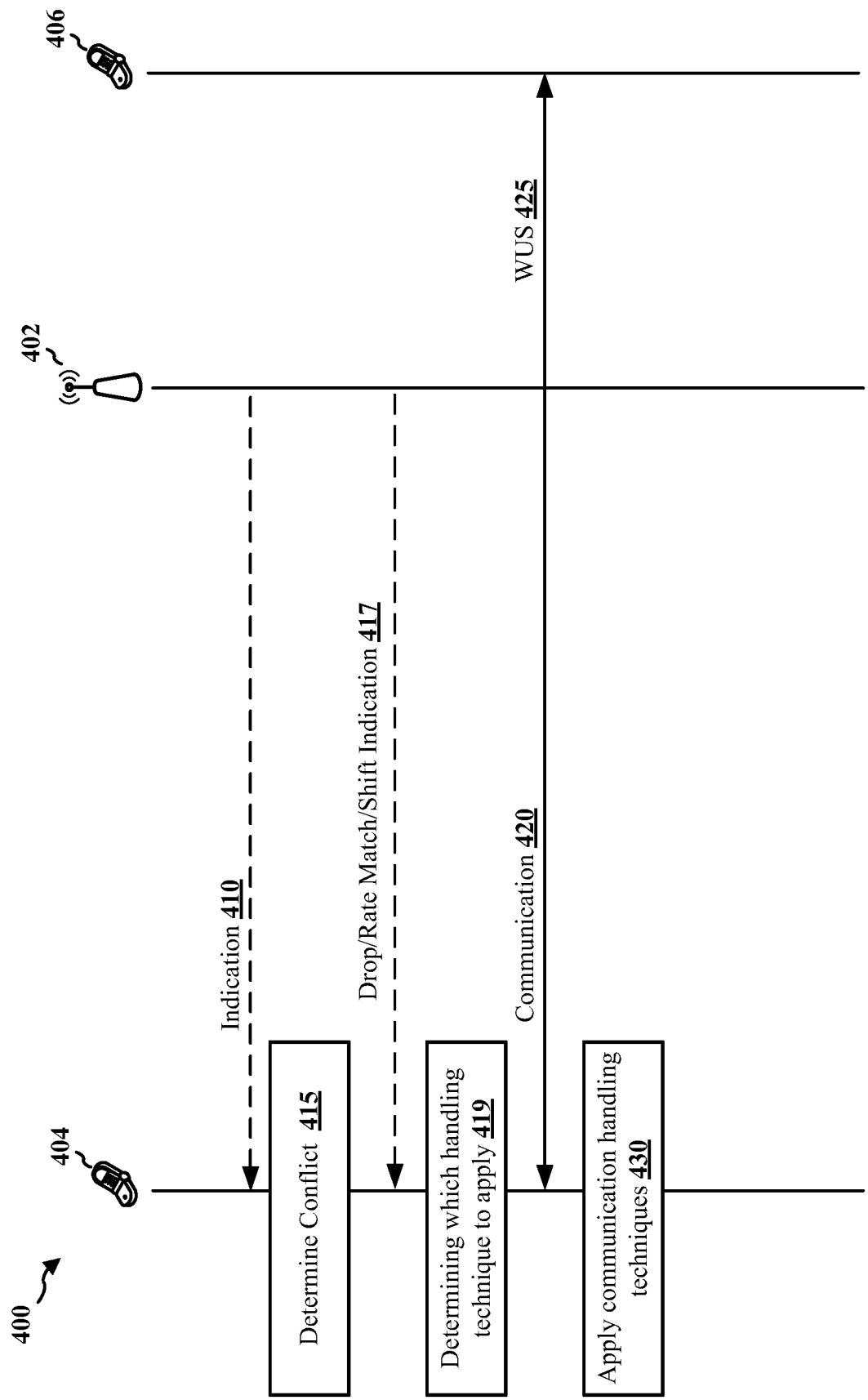
FIG. 4 is a diagram illustrating a call flow diagram between a UE and a base station, as disclosed herein.

FIG. 4 is a diagram illustrating a call flow diagram 400 between a UE 404 and a base station 402 implementing aspects of multiplexing of WUS resources and other resources, as disclosed herein. The UE 404 may correspond to the UE 104 of FIG. 1 and/or the UE 350 of FIG. 3. The base station 402 may correspond to the base station 102 of FIG. 1, the base station 180 of FIG. 1, and/or the base station 310 of FIG. 3. In the illustrated example of FIG. 4, the UE 404 is an active UE (e.g., a UE that is receiving data and/or reference signals on a dedicated resource). As illustrated at 415, the UE may determine that there may be a conflict between a communication transmitted for the UE and a WUS resource for a WUS 425 for transmission to another UE, such as an example UE 406. The dedicated resource may be used for a data transmission, a control transmission, and/or a reference signal transmission to the UE 404. In the illustrated example, the UE 404 will be aware of the dedicated resources (e.g., based on scheduled PDCCH, PDSCH and/or reference signals or based on uplink grants for PUSCH/PUCCH).

In the illustrated example of FIG. 4, the base station 402 may transmit an indication 410 that is received by the UE 404. The indication 410 may be configured by higher layers, such as the Radio Resource Control layer via a zero-power channel state information reference signal (ZP-CSI-RS) and/or a rate-matching resource configuration parameter (RateMatchPattern). In some examples, the indication 410 may identify one or more resources assigned for WUSs to one or more other UE(s) (e.g., the UE 406). In some such examples, based on the WUS resources identified in the indication 410, the UE 404 may be able to identify a conflicting resource(s) (e.g., an overlap between a resource used for a WUS transmission and a resource used for a cell-specific (or dedicated) communication), as illustrated at 415.

In the illustrated example, the base station 402 transmits a communication 420 that is received by the UE 404 using the resource configured for the UE 404 (e.g., the dedicated resource). The communication 420 may be a data transmission, a control transmission, and/or a reference signal transmission. In the illustrated example of FIG. 4, the communication 420 overlaps with a WUS resource.

At 430, the UE 404 applies communication handling techniques to process the communication 420. For example, the UE 404 may determine (or identify) whether the communication 420 (e.g., PDCCH, PDSCH, and/or reference signal) is in conflict with a WUS resource for another UE (e.g., the UE 406). In some examples, the UE 404 may determine that the communication 420 is in conflict with a WUS resource based on information included in the indication 410. For example, the indication 410 may indicate that the dedicated resource used for transmitting the communication 420 is also a resource assigned to a WUS. In some such examples in which the UE 404 determines that the communication 420 is in conflict with a WUS resource, the UE 404 may determine that it may be a problem for the UE 404 to monitor for communication and/or receive communication on the colliding resources. Therefore, the UE may modify an action related to the communication 420. For example, the UE may modify reception of the communication by determining not to receive, or not to monitor, for the communication. Alternately, the UE may receive the communication in a modified manner, e.g., using adjusted resources, using dropping, rate-matching, puncturing, etc.

In some examples, in response to detecting a potential collision between the WUS resources and dedicated resources for a data transmission or a control transmission, the UE 404 may modify reception of the communication 420 by operating as if the downlink information was not mapped to the overlapping (or conflicting) resource by the base station 402. In some such examples, the UE 404 may puncture (or drop) reception of the communication 420 in the overlapping resources. For example, the UE 404 may not decode the communication 420 in the overlapping resources.

In some examples, the communication 420 may be rate-matched by the base station 402 to avoid the overlapping resources. For example, the base station 402 may transmit the communication 420 without mapping the downlink information to the overlapping resources. In some such examples, the UE 404 may receive the communication 420 by similarly rate-matching around the overlapping resources.

In some examples, the UE 404 may need to determine between different types of techniques to apply in receiving communication(s) that collide with WUS resources (e.g., at 419). For example, the UE 404 may determine whether to puncture or rate-match reception of the communication 420 in the colliding resources. The base station 402 may provide an indication 417 that indicates whether information in the communication 420 is mapped to the overlapping resource and/or that indicates whether or not the UE 404 is to operate as if the downlink resources are mapped on the overlapping resources for the WUS. In some examples, the indication 417 may be scheduled downlink control information (DCI) that indicates whether the UE 404 is to operate as if information in the communication 420 is mapped to the overlapping resource. In some such examples, when the indication 417 indicates that information is rate-matched to the overlapping resource, the UE 404 may use rate-matching to receive the communication 420. However, in some examples, if the indication 417 indicates that information is mapped to the overlapping resource, the UE 404 may determine to drop the communication 420 in the overlapping resources.

In some examples, the indication 417 may include a schedule of resources assigned to WUSs. For example, the schedule may indicate one or more resources assigned to WUSs. In some such examples, the UE 404 may modify receipt of the communications corresponding to the overlapping resources by not decoding the respective communications (e.g., either by dropping (or puncturing) the communications, and/or by rate-matching around the overlapping resources).

In some example, the communication 420 may comprise a reference signal for the UE 404 that is scheduled on a resource overlapping with a WUS resource associated with another UE (e.g., the UE 406). The UE 404 may modify receipt of the communication 420 by operating as if the base station 402 did not map the reference signal onto the overlapping resource. In some such examples, the UE 404 may puncture (or drop) reception of the communication 420 on the overlapping resources, as described in connection with the potential collision between data/control and the WUS resource. For example, the UE 404 may not decode the reference signal in the overlapping resources. In another example, the UE may rate-match around the overlapping resources.

In some examples, the UE 404 may operate as if the reference signal is mapped to another location in time and/or frequency relative to the location of the overlapping resource (e.g., at a shifted location). In some such examples, the UE 404 may attempt to process (or decode) the reference signal at the shifted location and provide measurement(s) corresponding to the reference signal based on the shifted location.

The base station 402 may indicate, via the indication 417, that the reference signal is not mapped to the overlapping resource or that the reference signal is mapped to a shifted location. In some such examples, the UE 404 may process the communication 420 based on whether the reference signal is not mapped to the overlapping resource (e.g., the UE 404 may drop (or puncture) the communication 420) or whether the reference signal is mapped to the shifted location (e.g., by providing measurement(s) corresponding to the reference signal).

Thus, as the indication 417 may indicate different information in different instances (e.g., whether to drop the communication 420, whether to perform rate-matching for receiving the communication 420, whether to perform location shifting to receive the communication 420), the indication 417 may sometimes be referred to as a "dynamic indicator."

Figure 5:
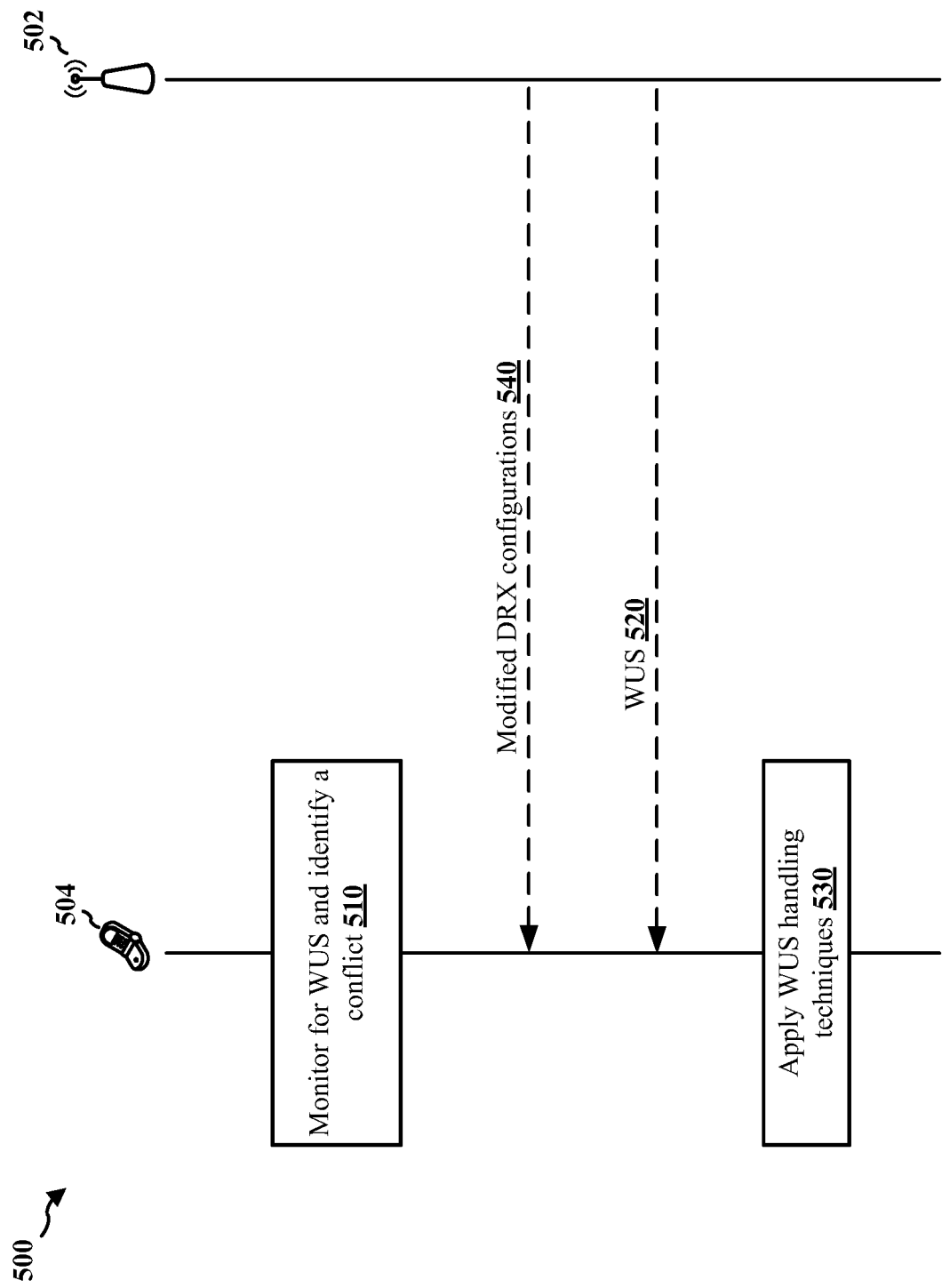
FIG. 5 is a diagram illustrating another call flow diagram between a UE and a base station, as disclosed herein.

FIG. 5 is a diagram illustrating a call flow diagram 500 between a UE 504 and a base station 502 implementing aspects of multiplexing of WUS resources and other resources, as disclosed herein. The UE 504 may correspond to the UE 104 of FIG. 1, the UE 350 of FIG. 3, and/or the UE 404 of FIG. 4. The base station 502 may correspond to the base station 102 of FIG. 1, the base station 180 of FIG. 1, the base station 310 of FIG. 3, and/or the base station 402 of FIG. 4. In the illustrated example of FIG. 5, the UE 504 is operating in a DRX cycle and monitoring for a WUS transmission on a resource in time and frequency assigned for the WUS transmission. The base station 502 may also be broadcasting (e.g., periodically, a-periodically, and/or as a one-time event) system resources that are shared by all or a group of UEs in the network. Examples of system resources include synchronization signals, PBCH, SIB, RMSI, OSI, group specific reference signals, semi-statically reserved resources for high priority services, etc.

At 510, the UE 504 monitors for a WUS transmission and identifies a potential conflict between a system resource and a WUS resource associated with the UE 504. For example, as the locations of system resources are known to the UE 504, the UE 504 is able to identify when a WUS resource according to the UE's DRX cycle overlaps with a system resource.

In the illustrated example of FIG. 5, the base station 502 may transmit a WUS 520 that is received by the UE 504.

At 530, the UE 504 may apply WUS handling techniques for managing the DRX cycle of the UE 504. In some examples, in response to identifying the overlapping between the WUS resources and system resources, the UE 504 may operate as if the WUS resources are shifted to another non-overlapping location when a collision occurs. For example, the UE 504 may monitor for the WUS 520 at a time prior to the system resources or at a time that does not overlap with the system resources.

In another example, the UE 504 may refrain from monitoring for the WUS 520 in resources that overlap in time with the system resources.

As disclosed above, in some examples, the WUS 520 may be used to transition the UE 504 from a sleep state to an awake state for a DRX-On duration, or may indicate to the UE 504 that no transmissions are scheduled for the UE 504 during the DRX-On duration and that the UE 504 can transition back to the sleep state. Thus, in some examples, in response to identifying the occurrence of overlapping resources, the UE 504 may transition to the awake state without monitoring for the WUS 520 (e.g., the UE 504 operates as if the WUS 520 was detected). This may cause the UE 504 to wake up even if no WUS was going to be transmitted, but helps to ensure that the UE 504 is awake if there is a communication for the UE 504.

In some examples, the base station 502 may transmit modified DRX configurations 540 that are received by the UE 504. In some such examples, the UE 504 may use the modified DRX configurations 540 when the WUS resources collide with system resources. For example, the UE 504 may receive the modified DRX configurations 540 prior to receiving the WUS 520. The modified DRX configurations 540 may be associated with one or more DRX parameters that are different than the current DRX configuration of the UE 504. In some examples, the modified DRX configurations 540 may shift the location of the WUS resource so that the UE monitors for the WUS in resources that do not overlap with the system resource (e.g., by moving the location of the WUS resource to a location prior to the system resource or to a location after the system resource). For example, the modified DRX configurations 540 may include a modified DRX cycle duration that is shorter than or longer than the current DRX cycle duration of the UE 504. In some examples, the modified DRX configurations 540 may additionally or alternatively include a modified DRX-On duration that is shorter than the current DRX-On duration of the UE 504. In some such examples in which the UE 504 is provided the modified DRX configurations 540, the UE 504 may apply the WUS handling techniques, at 530, by monitoring for the WUS 520 based on the modified DRX configurations 540.

In some examples, the WUS 520 may include a payload, such as a DRX-On duration parameter, a periodicity parameter of a WUS resource monitoring state for the current DRX cycle, a DRX cycle duration parameter associated with a duration of the current DRX cycle, an inactivity timer parameter associated with the sleep state for the current DRX cycle, etc. For example, the payload of the WUS 520 may include information instructing the UE 504 to extend the DRX-On duration of the current DRX cycle. In some such examples in which the WUS 520 is expected to include a payload and a collision occurs between the WUS 520 and the system resource, the UE 504 may apply a default value for the parameter(s) of the DRX cycle. For example, the UE 504 may apply a first default value for the DRX-On duration parameter, a second default value for the DRX cycle duration parameter, a third default value for the inactivity timer parameter, and/or may apply a fourth default value for the periodicity parameter. In other examples, the UE may 504 may apply a parameter from a period payload in a previous DRX cycle.

Figure 6A:
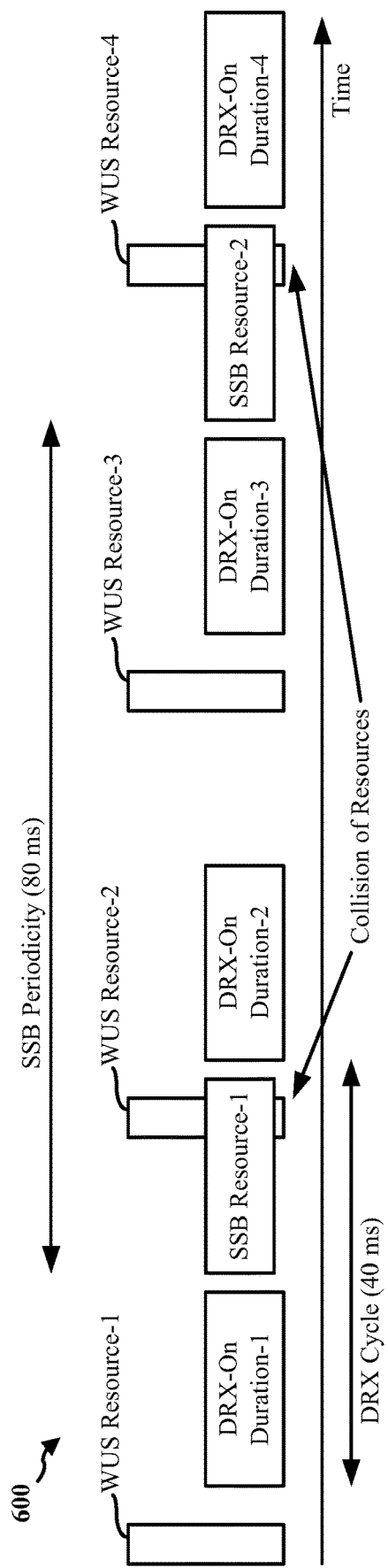
FIGS. 6A and 6B are diagrams illustrating example implementations of facilitating multiplexing of WUS resources and other resources, as disclosed herein.
Figure 6B:
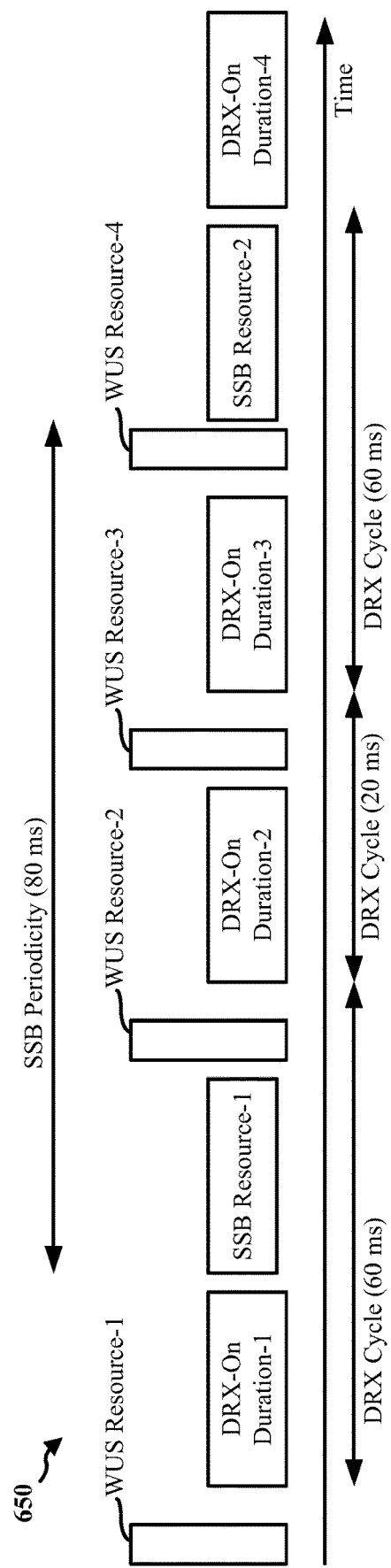

FIGS. 6A and 6B are diagrams 600, 650 illustrating example implementations of facilitating multiplexing of WUS resources and system resources, as disclosed herein. In the illustrated examples of FIGS. 6A and 6B, the system resources are SSB resources. However, in some examples, other system resources may additionally or alternatively be used.

In the illustrated example of FIG. 6A, the diagram 600 illustrates four example DRX cycles with a duration of 40 milliseconds (ms) each. Each WUS resource is followed by a corresponding DRX-On duration. The diagram 600 also includes two SSB blocks that are transmitted with 80 ms periodicity. As shown in FIG. 6A, the second WUS resource (e.g., WUS Resource-2) overlaps with the first SSB resource (e.g., SSB Resource-1) and the fourth WUS resource (e.g., WUS Resource-4) overlaps with the second SSB resource (e.g., SSB Resource-2).

In some such examples, and in view of the call flow diagram 500 of FIG. 5, in response to identifying the overlapping resources, the UE 504 may modify the DRX cycle of the UE 504. In some examples, the UE 504 may operate as if no WUS was transmitted by the base station and, thus, remain in the sleep state. For example, the UE 504 may disable monitoring for the WUS in the second WUS resource (e.g., the WUS Resource-2) and remain in the sleep state for the duration of the second DRX-On duration (e.g., the DRX-On Duration-2).

In some examples, the UE 504 may operate as if a WUS is detected and transition to the awake state without monitoring for the WUS in the WUS resource. For example, the UE 504 may not monitor for the WUS during the fourth WUS resource (e.g., the WUS Resource-4), and may transition to the awake state for the duration of the fourth DRX-On duration (e.g., the DRX-On Duration 4).

In the illustrated example of FIG. 6B, the diagram 650 illustrates four example DRX cycles with modified DRX configurations. Each WUS resource is followed by a corresponding DRX-On duration. The diagram 650 also includes two SSB blocks that are transmitted with 80 ms periodicity. As shown in FIG. 6B, the modified DRX configurations facilitate avoiding overlapping resources by shifting the location of the DRX cycles relative to the locations of the SSB blocks.

In the illustrated example of FIG. 6B, first modified DRX configurations modify the duration of the first DRX cycle to be sixty ms. In this illustrated example, the second WUS resource (e.g., the WUS Resource-2) and the second DRX-On duration (e.g., the DRX-On duration-2) are both shifted to a location after the first SSB block (e.g., the SSB Resource-1). However, in additional or alternative examples, the first modified DRX configurations may modify the duration of the first DRX cycle so that the second WUS resource (e.g., the WUS Resource-2) and the second DRX-On duration (e.g., the DRX-On duration-2) are both shifted to a location prior to the first SSB block (e.g., the SSB Resource-1). For example, the first modified DRX configurations may shorten the period of the first DRX cycle relative to the duration of the DRX cycles shown in the diagram 600 of FIG. 6A.

In some examples, the modified DRX configurations may shift the location of the WUS resource but not the location of the corresponding DRX-On duration. For example, in the illustrated example of FIG. 6B, the location of the fourth WUS resource (e.g., the WUS Resource-4) is shifted to a location prior to the second SSB block (e.g., the SSB Resource-2) while the location of the fourth DRX-On duration (e.g., the DRX-On Duration-4) is located at a position after the second SSB block (e.g., the SSB Resource-2).

Figure 7:
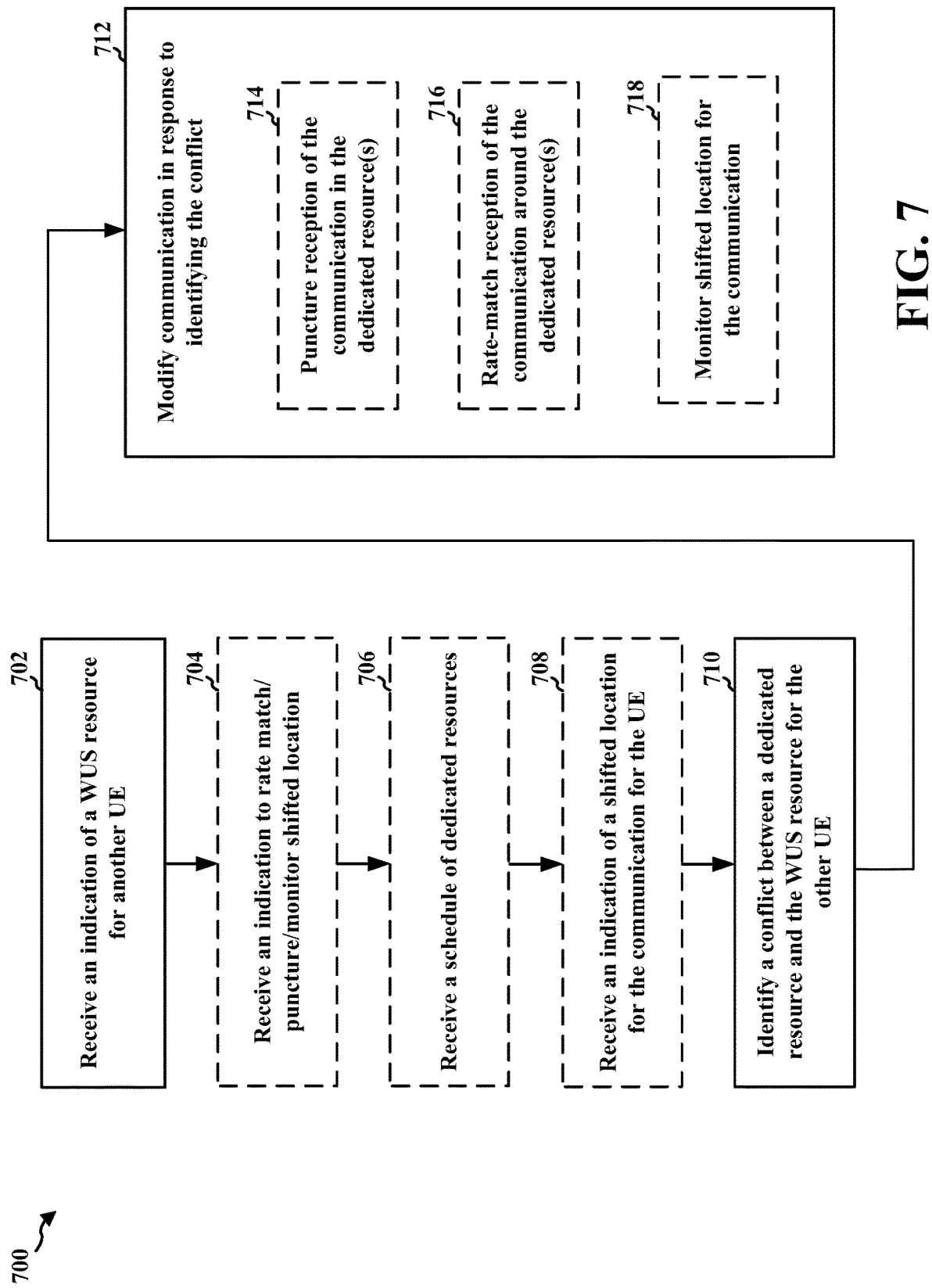
FIG. 7 is a flowchart of a method of wireless communication.

FIG. 7 is a flowchart 700 of a method of wireless communication. The method may be performed by a UE (e.g., the UE 104, 350, 404, 504; the apparatus 802/802'; the processing system 914, which may include the memory 360 and which may be the entire UE 350 or a component of the UE 350, such as the TX processor 368, the RX processor 356, and/or the controller/processor 359). Optional aspects are illustrated with a dashed line. The method of FIG. 7 enables a UE to adjust reception of control, data, and/or reference signals in order to accommodate for WUS(s) that may be transmitted to other UEs, as disclosed herein.

At 702, the UE receives a first indication of a WUS resource for another UE, as described in connection with indication 410 of FIG. 4. The receiving of the first indication may be performed, for example, by a reception component 804 and/or an indication component 820 of the apparatus 802 of FIG. 8. The indication may indicate WUS resource(s) in time and/or frequency for the other UE. The UE may receive indications of WUS resources for multiple UEs. The indication may be provided from a base station (e.g., the base station 402 of FIG. 4) in a rate-matching resource configuration parameter (e.g., as part of a rate-matching pattern parameter). As another example, the indication of the WUS resource(s) may be provided by a ZP-CSI-RS.

At 710, the UE identifies a conflict between a dedicated resource allocated to the UE and the WUS resource for the other UE based on the first indication, as described in connection with 415 of FIG. 4. The identifying of the conflict may be performed, for example, by a conflict identification component 810 of the apparatus 802. The dedicated resource may be for a downlink data transmission (e.g., PDSCH) for the UE and/or for a downlink control transmission (e.g., PDCCH) for the UE. As another example, the dedicated resources may be for a reference signal for the UE (e.g., CSI-RS PTRS, tracking RS, DMRS, etc.). As the UE is aware of its own scheduled transmissions, the UE may determine whether a conflict exists between the WUS resource(s) for the other UE(s) and dedicated resources for PDCCH, PDSCH, and/or RS for the UE. In some examples, the dedicated resource may be for an uplink data transmission (e.g., PUSCH), and/or for an uplink control transmission (e.g., PUCCH).

At 712, in response to the identifying of the conflict, the UE modifies communication with the base station. For example, the UE may modify reception of communication in the dedicated resource, as described in connection with 430 of FIG. 4. The modifying of the reception of the communication may be performed, for example, by a modification component 812, a puncture component 814, a rate-match component 816, and/or a location component 818 of the apparatus 802. The UE may modify reception of the communication in various ways (e.g., based on the type of communication, based on an indication from the base station, etc.).

For example, modifying of the reception of the dedicated resource may include receiving the communication, wherein the UE modifies reception of the communication by puncturing or dropping, at 714, of the communication that overlaps with the WUS resource. The puncturing or dropping of the communication may be performed, for example, by the puncture component 814 of the apparatus 802. Thus, the UE may assume that downlink resources are not mapped on the overlapping resources and may drop the communication received in those conflicting resources. In some examples, the UE may autonomously drop reception during the conflicting resources, even though the base station may transmit the communication on the resources.

In some examples, the UE may modify the communication by rate-matching, at 716, around the dedicated resource, e.g., rate-matching around the WUS resource. The rate-matching may be performed, for example, by the rate-match component 816 of the apparatus 802. Thus, the UE may operate as if the base station does not transmit the communication in the conflicting resources and, instead, has rate-matched the communication in order to avoid the conflicting resources. The UE may apply a corresponding rate-matching in receiving the communication.

The base station may provide an indication to the UE of the type of modification to use when there is a conflict between the WUS resource and the downlink communication for the UE. For example, the base station may dynamically indicate (e.g., such as through scheduling DCI) whether or not the UE is to operate as if the downlink communication is mapped to the conflicting resources. Thus, at 704, the UE may receive, prior to the WUS resource, a second indication of whether to use puncturing or rate-matching around the WUS resource to receive the communication, as described in connection with the indication 417 of FIG. 4. The receiving of the second indication may be performed, for example, by the reception component 804 and/or the indication component 820 of the apparatus 802. Then, at 712, the UE may modify reception of the communication by puncturing or rate-matching the communication (e.g., at 714 or 716) based on the second indication. For example, the puncture component 814 of the apparatus 802 may perform the puncturing of the communication or the rate-match component 816 of the apparatus 802 may perform the rate-matching.

In another example, the UE may receive, prior to the WUS resource, a schedule of one or more resources that at least partially overlap the WUS resource, at 706, as described in connection with indication 410 of FIG. 4. The receiving of the schedule may be performed, for example, by the reception component 804 and/or the indication component 820 of the apparatus 802. In some such examples, at 712, the UE may modify reception of corresponding communications in the one or more dedicated resources based on the received schedule. As described in connection with 714 and 716, modifying of the reception of one of the corresponding communications in the one or more dedicated resources, at 712, based on the schedule may include puncturing or rate-matching reception of the corresponding communications in the one or more dedicated resources based on the schedule.

In some examples, the received schedule, at 706, may indicate respective shifted locations in at least one of time or frequency for the corresponding communications based on conflicts between the one or more dedicated resources and corresponding WUS resources. In some such examples, the UE may modify, at 712, the corresponding communications in the one or more dedicated resources including monitoring for the corresponding communications at the respective shifted locations.

For example, the UE may receive, at 708, an indication of a shifted location of the downlink reference signal for the UE that conflicts with the WUS resource(s) for the other UE(s), as described in connection with the indication 417 of FIG. 4. The receiving of the respective shifted locations may be performed, for example, by the reception component 804 and/or a WUS resource component 808 of the apparatus 802. In some such examples, the UE may modify, at 712, reception of the dedicated resource by monitoring for the downlink reference signal at the shifted location, at 718, as described in connection with 430 of FIG. 4. The monitoring at the shifted location may be performed, for example, by the location component 818 of the apparatus 802.

In some examples, the indication received at 704 may indicate whether to modify reception of the downlink reference signal based on puncturing, rate-matching, or monitoring a shifted location. Then, the UE may modify the reception of the downlink reference signal based on the second indication (e.g., by applying 714, 716, or 718 according to the indication received at 704).

Figure 8:
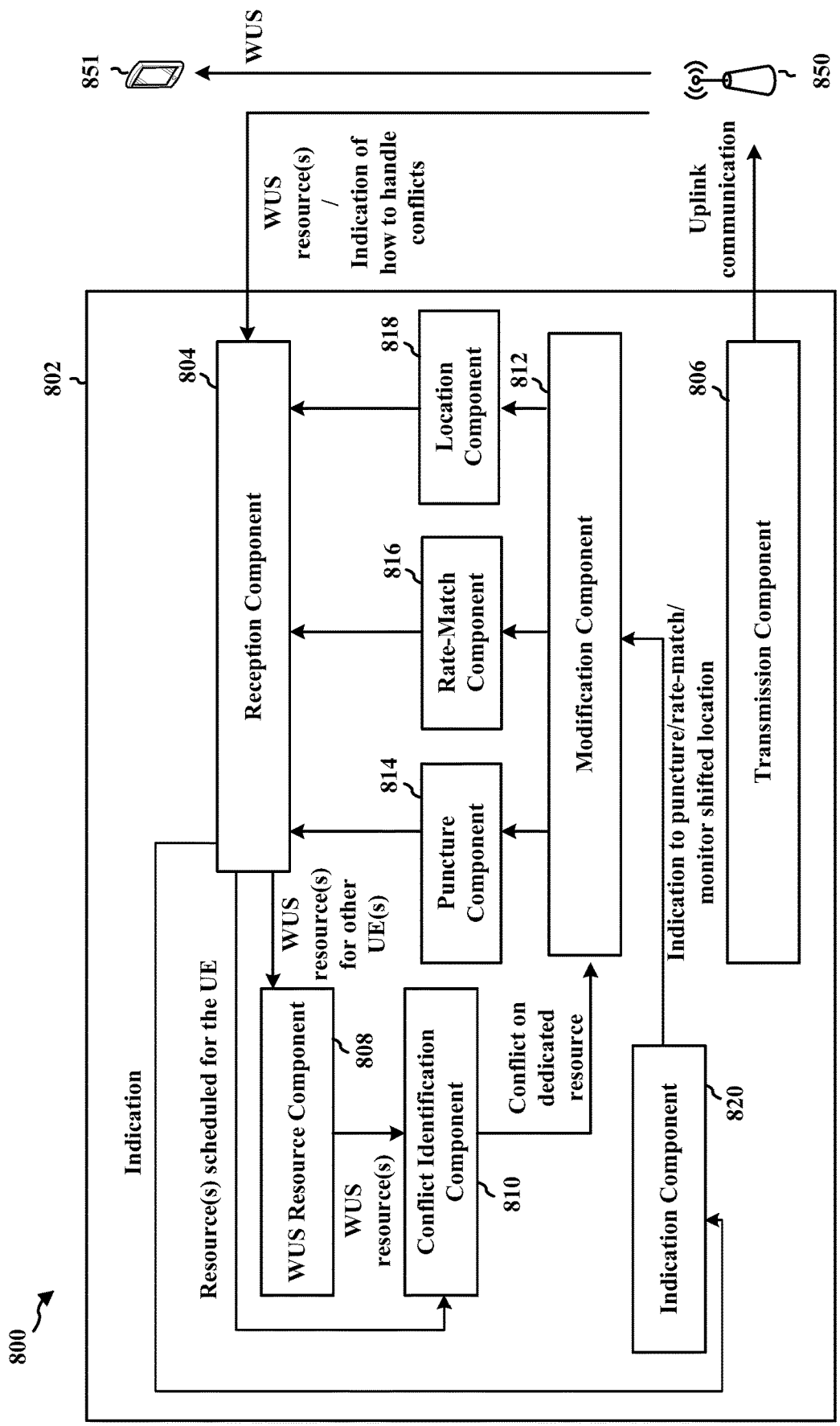
FIG. 8 is a conceptual data flow diagram illustrating the data flow between different means/components in an example apparatus.

FIG. 8 is a conceptual data flow diagram 800 illustrating the data flow between different means/components in an example apparatus 802. The apparatus 802 may be a UE or a component of a UE. The apparatus 802 includes a reception component 804, a transmission component 806, a WUS resource component 808, a conflict identification component 810, a modification component 812, a puncture component 814, a rate-match component 816, a location component 818, and an indication component 820.

The reception component 804 of the apparatus 802 may be configured to receive communications from, for example, a base station 850 and/or another UE 851 (e.g., as described in connection with 702, 704, 706, and/or 708).

The transmission component 806 of the apparatus 802 may be configured to transmit uplink communications, for example, to the base station 850.

The WUS resource component 808 of the apparatus 802 may be configured to receive a first indication of a WUS resource for another UE 851 (e.g., as described in connection with 708).

The conflict identification component 810 of the apparatus 802 may be configured to identify a conflict between a resource allocated to the UE and the WUS resource for the other UE based on the first indication (e.g., as described in connection with 710).

The modification component 812 of the apparatus 802 may be configured to modify communication with a base station in response to identifying the conflict (e.g., as described in connection with 712).

The puncture component 814 of the apparatus 802 may be configured to puncture reception of the communication in the WUS resource (e.g., as described in connection with 712, 714).

The rate-match component 816 of the apparatus 802 may be configured to rate-match around the WUS resource (e.g., as described in connection with 712, 716).

The location component 818 of the apparatus 802 may be configured to monitor for communication, such as a downlink reference signal, at the shifted location (e.g., as described in connection with 712, 718).

The indication component 820 of the apparatus 802 may be configured to receive an indication of whether to puncture reception of the communication, to rate-match around the dedicated resource, or monitor a shifted location for the communication (e.g., as described in connection with 702, 704, 706).

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
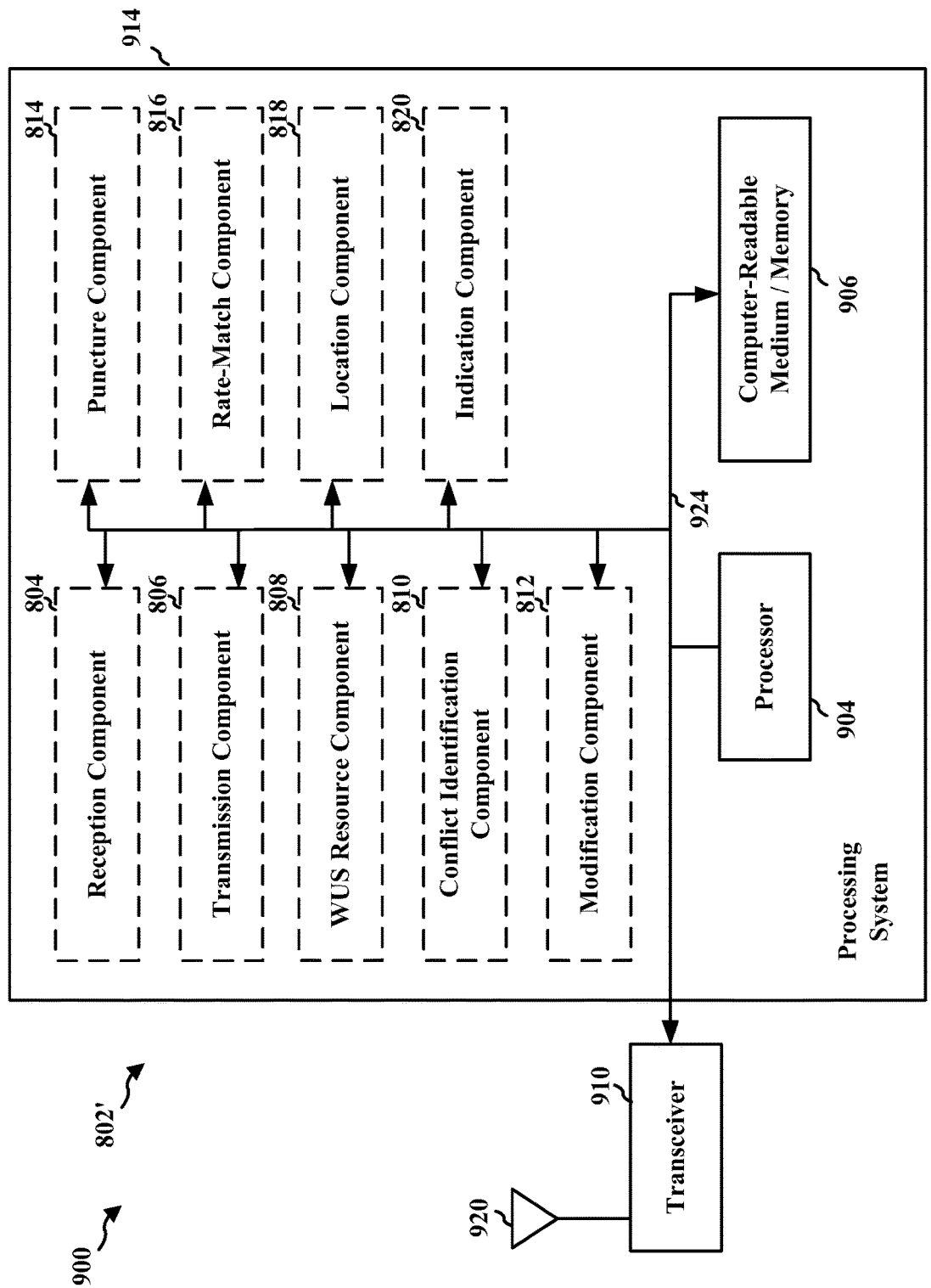
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812, 814, 816, 818, 820, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 806, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812, 814, 816, 818, 820. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359. Alternatively, the processing system 914 may be the entire UE (e.g., see 350 of FIG. 3).

In one configuration, the apparatus 802/802' for wireless communication includes means for receiving a first indication of a Wake-Up Signal (WUS) resource for another UE. The apparatus 802/802' also includes means for identifying a conflict between a resource allocated to the UE and the WUS resource for the other UE based on the first indication. The apparatus 802/802' also includes means for modifying communication with a base station in response to the identifying of the conflict. The apparatus 802/802' may also include means for modifying reception of the communication by puncturing reception of the communication in the resource. The apparatus 802/802' may also include means for modifying reception of the communication by rate-matching around the resource. The apparatus 802/802' may also include means for receiving, prior to the WUS resource, a second indication of whether to puncture reception of a communication or to rate-match around the resource, and where modifying reception of the communication includes puncturing or rate matching the communication based on the second indication. The apparatus 802/802' may also include means for receiving, prior to the WUS resource, a schedule of one or more resources that at least partially overlap the WUS resource. The apparatus 802/802' may also include means for modifying reception of corresponding communications in the one or more resources based on the schedule. The apparatus 802/802' may also include means for modifying the reception of the corresponding communication by puncturing reception of the corresponding communications in the one or more resources based on the schedule. The apparatus 802/802' may also include means for modifying reception of the corresponding communication by rate-matching around the respective resource based on the schedule. The apparatus 802/802' may also include means for modifying the reception of the corresponding communications in the one or more resources including for the corresponding communications at respective shifted locations. The apparatus 802/802' may also include means for modifying the reception of the communication in the one or more resource includes puncturing reception of the downlink reference signal on the resource or rate matching reception of the downlink reference signal around the resource. The apparatus 802/802' may also include means for receiving a second indication of a shifted location of the downlink reference signal, and where modifying communication includes monitoring for the downlink reference signal at the shifted location. The apparatus 802/802' may also include means for receiving a second indication indicating whether to modify reception of the downlink reference signal based on puncturing, rate matching, or monitoring a shifted location, and where the UE modifies receipt of the downlink reference signal based on the second indication. The apparatus 802/802' may also include means for identifying the conflict is between the WUS resource for the other UE and an uplink transmission.

The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
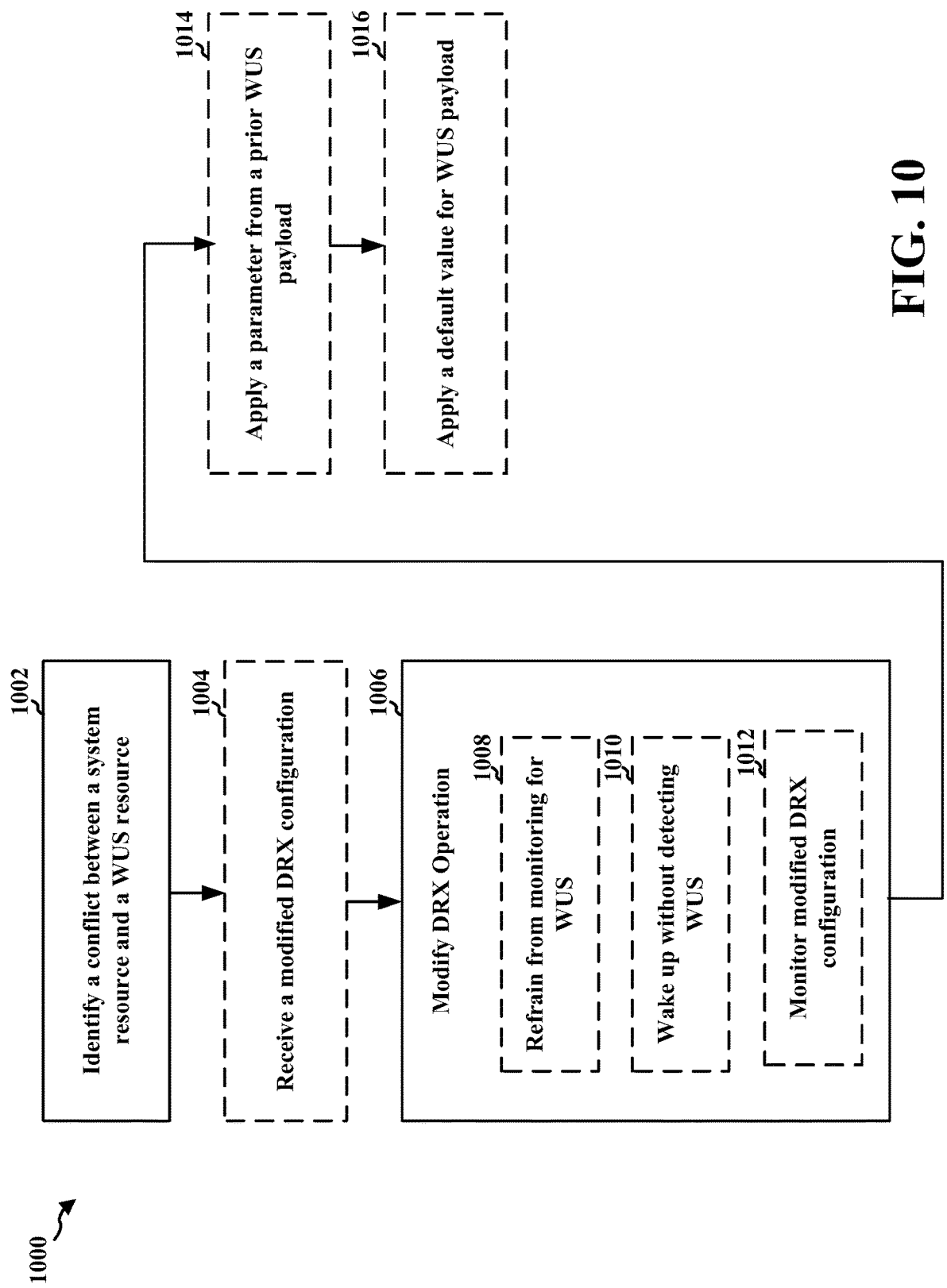
FIG. 10 is a flowchart of a method of wireless communication.

FIG. 10 is a flowchart 1000 of a method of wireless communication. The method may be performed by a UE (e.g., the UE 104, 350, 404, 504; the apparatus 1102/1102'; the processing system 1214, which may include the memory 360 and which may be the entire UE 350 or a component of the UE 350, such as the TX processor 368, the RX processor 356, and/or the controller/processor 359). Optional aspects are illustrated with a dashed line. The method of FIG. 10 enables a UE to adjust reception of WUSs in order to accommodate for collisions with system resources, as disclosed herein.

At 1002, the UE identifies a conflict between a system resource and a WUS resource associated with the UE while the UE is operating based on DRX, e.g., in a DRX state, as described in connection with 510 of FIG. 5. The identifying of the conflict may be performed, for example, by a conflict identification component 1110 of the apparatus 1102 of FIG. 11. The conflict may be identified based on an overlap in time between the WUS resource and the system resource. The system resource may include resource(s) for any of an SSB, a PBCH, a SIB, OSI, RMSI, a group-specific reference signal, or a statically-reserved resource.

At 1006, after the identifying of the conflict, the UE modifies DRX operation in response to identifying the conflict between the system resource and the WUS resource, as described in connection with 530 of FIG. 5. The modifying of the DRX operation may be performed, for example, by a modification component 1112, a WUS component 1114, an awake component 1116, and/or a DRX configuration component 1118 of the apparatus 1102.

In some examples, the UE may modify DRX operation by refraining from monitoring for a WUS, at 1008, in resources that overlap in time with the system resources, e.g., as described in connection with 530 of FIG. 5. Thus, the UE may not monitor for a WUS when the WUS resource overlaps with the system resource. The determination not to monitor for the WUS may be performed, for example, by the WUS component 1114 of the apparatus 1102. Thus, the UE may refrain from monitoring for the WUS when the UE identifies a conflict, at 1002.

In some examples, the UE may wake up during a DRX-On duration following the WUS resource, at 1010 (e.g., without monitoring for the WUS resource), as described in connection with 530 of FIG. 5. The wake-up, e.g., entering/transitioning to the awake state, may be performed, for example, by the awake component 1116 of the apparatus 1102. In some examples, modifying the DRX operation, at 1006, may include applying at least one of a default DRX-On duration, a default DRX cycle duration, a default inactivity timer, or a default periodicity in response to identifying the conflict between the system resource and the WUS resource. Thus, the UE may wake-up during a DRX-On duration without monitoring the WUS resource that conflicts with the system resource, where the UE wakes up based on the at least one of the default DRX-On duration, the default DRX cycle duration, the default inactivity timer, or the default periodicity.

In some examples, the UE may operate as if the WUS resources are shifted to another non-overlapping location when a collision occurs. As illustrated at 1004, the UE may receive a modified DRX configuration different than a DRX configuration associated with the DRX state of the UE, as described in connection with the modified DRX configurations 540 of FIG. 5. The receiving of the modified DRX configurations may be performed, for example, by a reception component 1104 and/or the modification component 1112 of the apparatus 1102. Modifying the DRX operation, at 1006, may include monitoring an adjusted WUS resource, at 1012, based on the modified DRX configuration in response to identifying the conflict between the system resource and the WUS resource. The modified DRX configuration may comprise a modified DRX cycle duration, e.g., a second DRX configuration that may be associated with a shorter active time (e.g., a shorter on-duration, a shorter inactivity timer, etc.). In some such examples, at 1012, the UE may monitor for the WUS based on the modified DRX configuration (e.g., when the conflict is identified) as described in connection with 530 of FIG. 5. The monitoring for the WUS based on the modified DRX configuration may be performed, for example, by DRX configuration component 1118 of the apparatus 1102. The modified DRX configuration may include a modified DRX cycle duration. The modified DRX configuration may include a modified DRX-On duration. The UE may monitor for the WUS based on the modified DRX configuration by monitoring for the WUS at a location prior to the system resource and entering an awake state associated with the DRX state prior to the system resource. In another example, the UE may monitor for the WUS based on the modified DRX configuration by monitoring for the WUS at a location prior to the system resource and entering an awake state associated with the DRX state after the system resource. The UE may monitor for a WUS at a non-overlapping location with respect to the system resource and may wake-up prior to the system resource. In another example, the UE may monitor for a WUS at a non-overlapping location with respect to the system resource and may wake-up after to the system resource.

In some examples, the WUS, received at 1006, having the conflict with the system resource may comprise a payload, as described in connection with the WUS 520 of FIG. 5. Reception of a payload in a WUS may be performed, for example, by the reception component 1104 and/or the payload component 1108 of the apparatus 1102. If the UE does not monitor for the WUS or is not able to receive the WUS due to the conflict, the UE may make an assumption regarding the payload. The payload may include a DRX-On duration parameter associated with the DRX state, a DRX cycle duration parameter associated with the duration of the current DRX cycle, an inactivity timer parameter associated with the DRX state, and/or a periodicity parameter associated with the DRX cycle. In some examples, in response to a collision of the WUS resource and the system resource, the UE may apply a default DRX-On duration parameter, a default DRX cycle duration parameter, a default inactivity timer parameter, and/or a default periodicity parameter, at 1016. In some examples, rather than applying a default payload, the UE may apply a parameter from a prior payload in a previous DRX cycle, at 1014, in response to a collision of the WUS resource and the system resource. The applying of the parameter from a prior WUS payload and/or the applying of the default value for the WUS payload may be performed, for example, by the payload component 1108 of the apparatus 1102.

Figure 11:
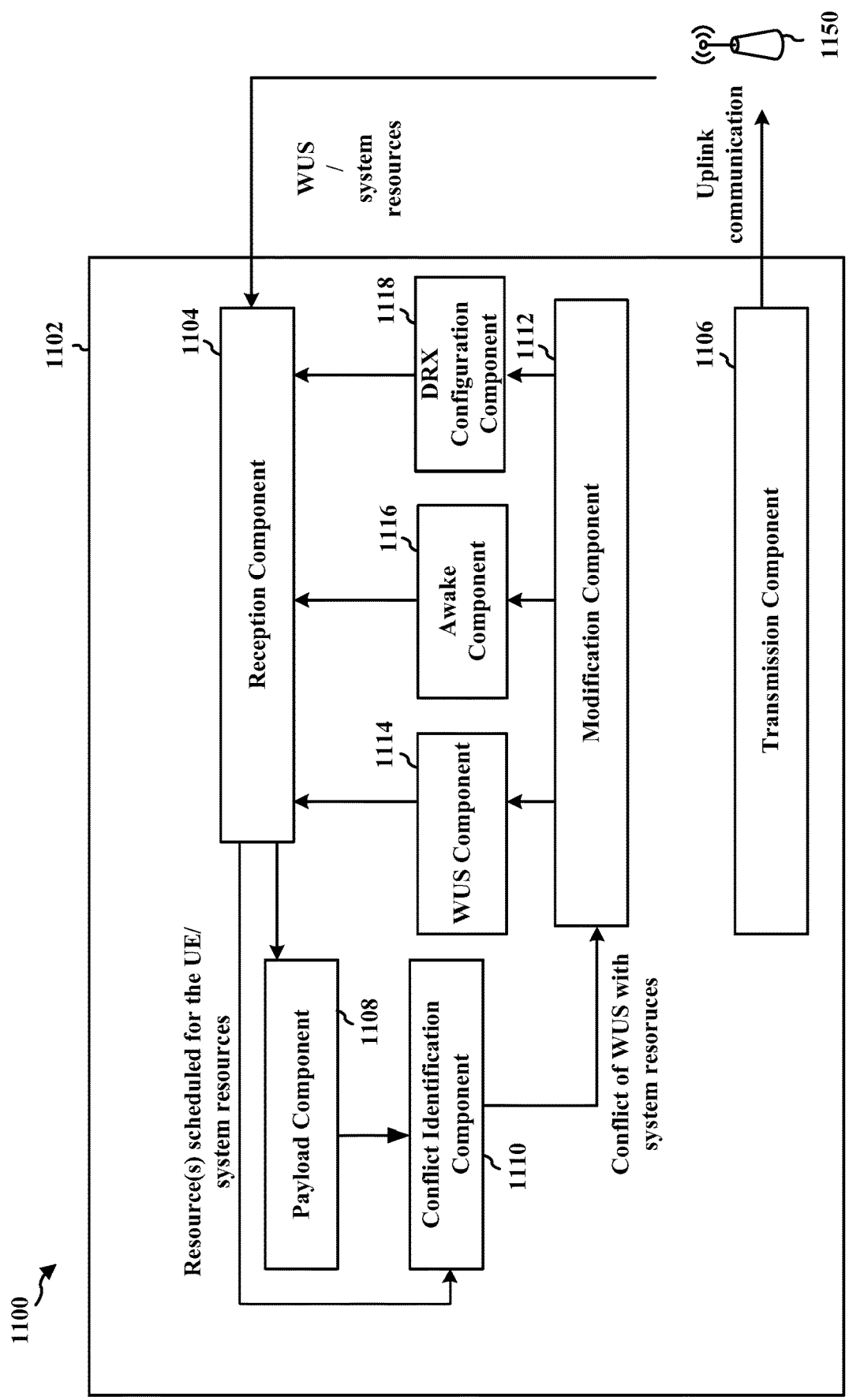
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus 1102 may be a UE or a component of UE. The apparatus 1102 includes a reception component 1104, a transmission component 1106, a payload component 1108, a conflict identification component 1110, a modification component 1112, a WUS component 1114, an awake component 1116, and a DRX configuration component 1118.

The reception component 1104 of the apparatus 1102 may be configured to receive downlink communication from a base station 1150 (e.g., as described in connection with 1004, 1006).

The transmission component 1106 of the apparatus 1102 may be configured to transmit uplink communications to the base station 1150.

The payload component 1108 of the apparatus 1102 may be configured to apply a DRX-On duration parameter, a DRX cycle duration parameter, an inactivity timer, a periodicity parameter, etc. In some examples, when there is a conflict between the WUS resources and the system resources, the payload component 1108 may apply at least one of a default DRX-On duration parameter, a default DRX cycle duration parameter, a default inactivity timer parameter, or a default periodicity parameter. In some examples, the payload component 1108 may apply a parameter from a prior payload in a previous DRX cycle in response to a collision of the WUS resource and the system resource (e.g., as described in connection with 1014, 1016).

The conflict identification component 1110 of the apparatus 1102 may be configured to identify a conflict between a system resource and a WUS resource associated with the UE while the UE is operating based on DRX (e.g., as described in connection with 1002).

The modification component 1112 of the apparatus 1102 may be configured to modify DRX operation in response to the identifying of the conflict between the system resource and the WUS resource (e.g., as described in connection with 1004, 1006).

The WUS component 1114 of the apparatus 1102 may be configured to refrain from monitoring for a WUS during the WUS resource in resources that overlap in time with the system resources (e.g., as described in connection with 1006, 1008).

The awake component 1116 of the apparatus 1102 may be configured to enter an awake state associated with the DRX state without monitoring for the WUS (e.g., as described in connection with 1006, 1010).

The DRX configuration component 1118 of the apparatus 1102 may be configured to receive a modified DRX configuration different than a DRX configuration associated with the DRX state of the UE, wherein the UE monitors for the WUS based on the modified DRX configuration (e.g., as described in connection with 1004, 1006).

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
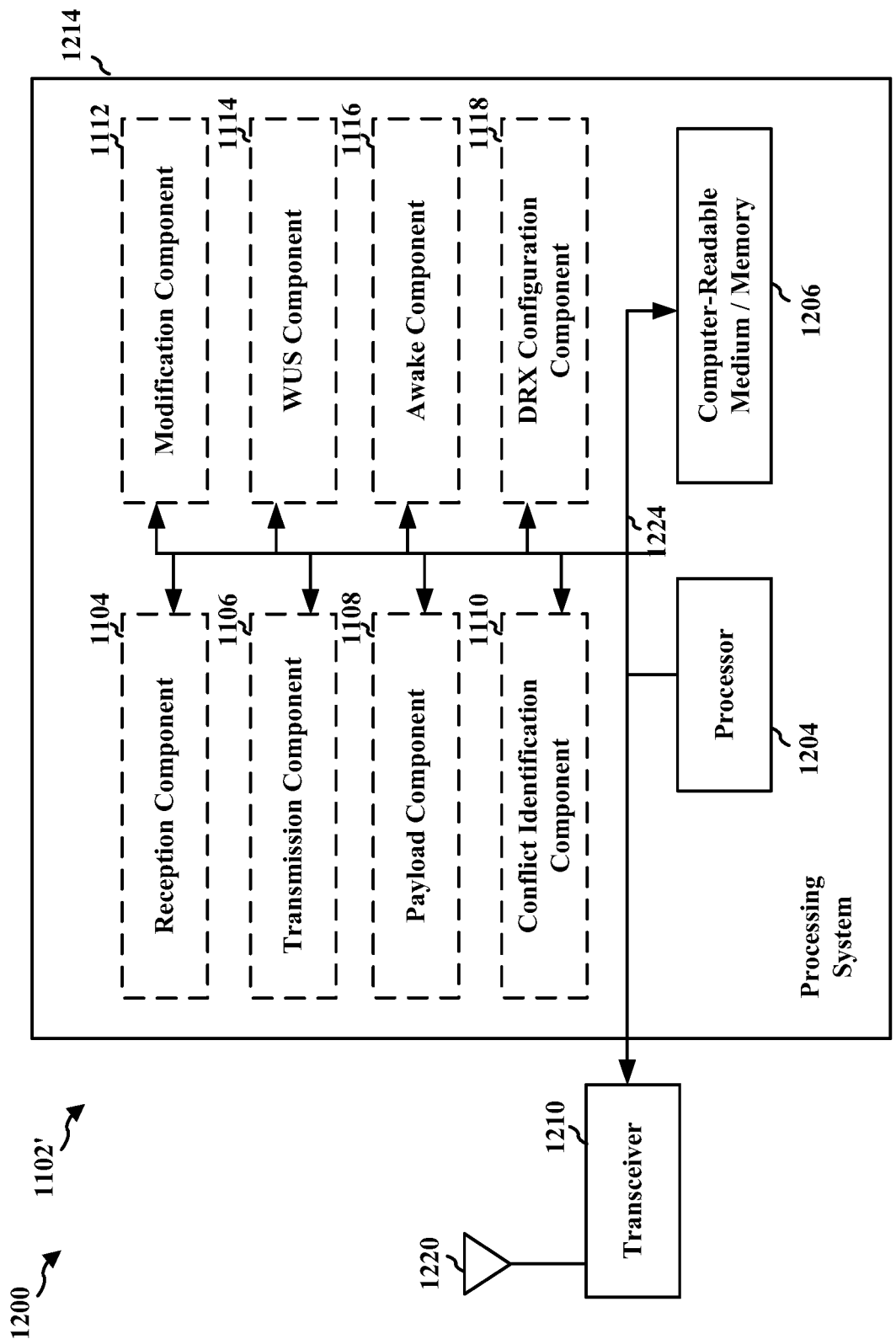
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, 1114, 1116, 1118, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1106, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112, 1114, 1116, 1118. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359. Alternatively, the processing system 1214 may be the entire UE (e.g., see 350 of FIG. 3).

In one configuration, the apparatus 1102/1102' for wireless communication includes means for identifying a conflict between a system resource and a WUS resource associated with the UE while the UE is operating based on DRX. The apparatus 1102/1102' may also include means for modifying DRX operation in response to the identifying of the conflict. The apparatus 1102/1102' may also include means for applying, in response to a collision of the WUS resource and the system resource, at least one of a default DRX-On duration parameter, a default DRX cycle duration parameter, a default inactivity timer parameter, or a default periodicity parameter. The apparatus 1102/1102' may also include means for applying a parameter from a prior payload in a previous DRX cycle in response to a collision of the WUS resource and the system resource. The apparatus 1102/1102' may also include means for modifying the DRX operation by waking up during the DRX-On duration without monitoring for the WUS resource. The apparatus 1102/1102' may also include means for modifying the DRX operation by not monitoring for the WUS in resources that overlap in time with the system resources. The apparatus 1102/1102' may also include means for receiving a modified DRX configuration different than a DRX configuration associated with the DRX state of the UE. The apparatus 1102/1102' may also include means for monitoring for the WUS based on the modified DRX configuration. The apparatus 1102/1102' may also include means for monitoring for the WUS at a non-overlapping location with respect to the system resource. The apparatus 1102/1102' may also include means for waking up prior to the system resource. The apparatus 1102/1102' may also include means for monitoring for the WUS resource at a non-overlapping location with respect to the system resource. The apparatus 1102/1102' may also include means for waking up after the system resource.

The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
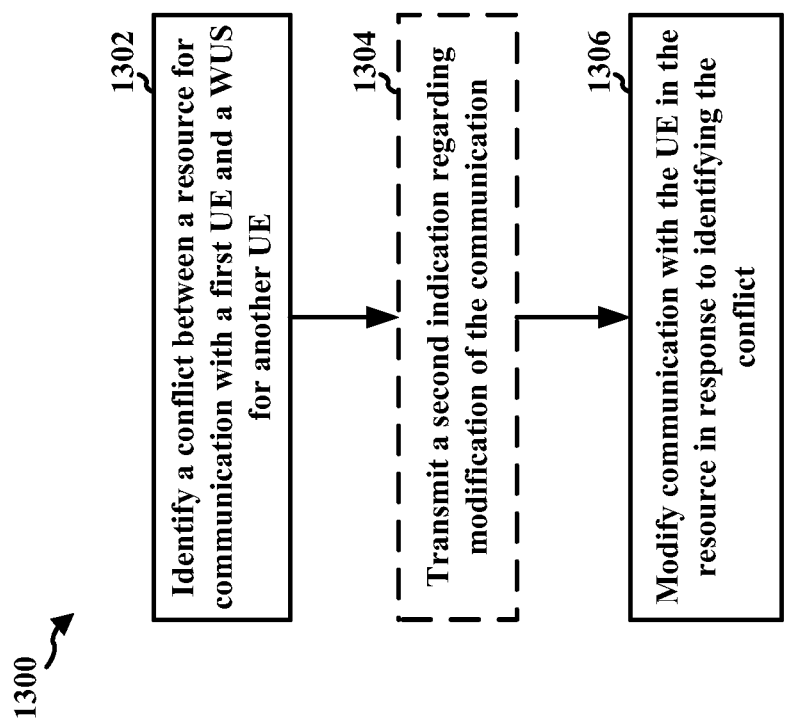
FIG. 13 is a flowchart of a method of wireless communication.

FIG. 13 is a flowchart 1300 of a method of wireless communication. The method may be performed by a base station (e.g., the base station 102, 180, 310, 402, 502; the apparatus 1402/1402'; the processing system 1514, which may include the memory 376 and which may be the entire base station 310 or a component of the base station 310, such as the TX processor 316, the RX processor 370, and/or the controller/processor 375). Optional aspects are illustrated with a dashed line. The method of FIG. 13 facilitates enabling a UE to adjust reception of control, data, and/or reference signals in order to accommodate for WUS(s) that may be transmitted to other UEs, as disclosed herein.

At 1302, the base station identifies a conflict between a resource for communicating with a first UE and a WUS resource for another UE, as described in connection with indication 410 of FIG. 4. The identification may be performed, for example, by an identification component 1408 and/or a transmission component 1406 of the apparatus 1402 of FIG. 14. In some examples, the base station may send a first indication of the WUS resource for the other UE, e.g., the first indication may be comprised in a rate-matching resource configuration parameter.

At 1304, the base station may transmit a second indication regarding modification of receipt of a communication, as described above in connection with the indication 417 of FIG. 4. The transmitting of the second indication may be performed, for example, by a second indication transmission component 1410 and/or the transmission component 1406 of the apparatus 1402. In some examples, the second indication may indicate whether the base station modifies the communication by puncturing the communication or rate-matching around a resource. In some examples, the second indication may be provided through DCI.

At 1306, the base station modifies the communication with the first UE in the resource in response to identifying the conflict, e.g., as described in connection with the communication 420 of FIG. 4. The modification of the communication may be performed, for example, by a communication transmission component 1412 and/or the transmission component 1406 of the apparatus 1402. In some examples, the resource may be for a downlink data transmission to the first UE or for a downlink control transmission to the first UE. In some examples, the communication may be a downlink reference signal. For example, the downlink reference signal may include one of CSI-RS, PTRS, a tracking reference signal, and a DMRS.

In some examples, receipt of the communication may be modified based on an identifying that the WUS resource conflicts with the resource associated with the UE. In some such examples, modifying the receipt of the WUS resource may include puncturing transmission of the communication in the resource. In some examples, modifying the receipt of the WUS resource may include rate-matching around the resource when transmitting the communication to the UE.

In some examples, the first indication and/or the second indication may include a schedule of one or more resources. In some such examples, modifying the communication may be based on the schedule and the one or more resources. For example, the base station may transmit the communication based on the schedule.

In some examples, the communication may comprise an uplink data transmission or an uplink control transmission. In some such examples, the conflict may be between the WUS resource for the second UE and the uplink data transmission or the uplink control transmission for the first UE.

Figure 14:
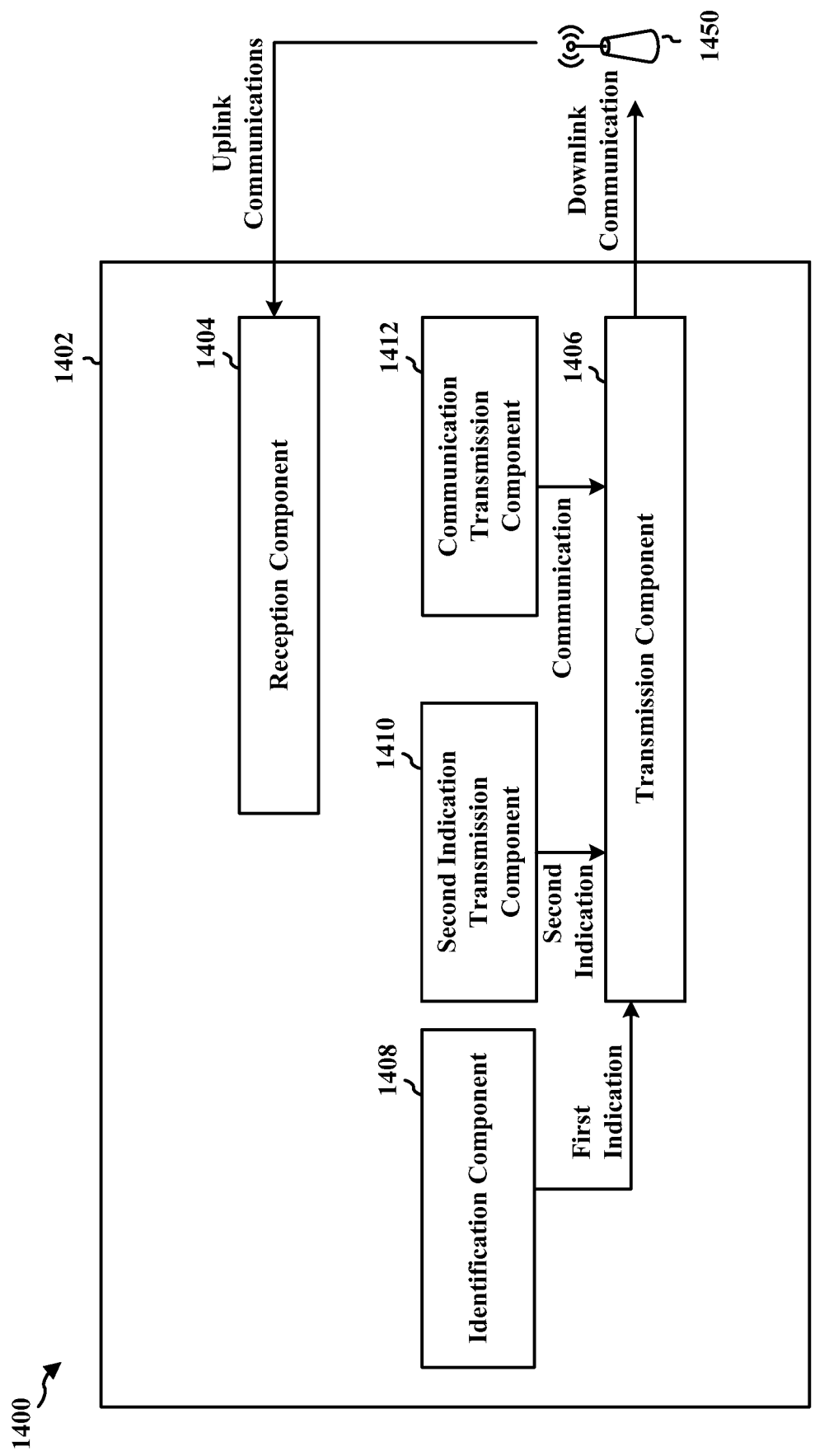
FIG. 14 is a conceptual data flow diagram illustrating the data flow between different means/components in an example apparatus.

FIG. 14 is a conceptual data flow diagram 1400 illustrating the data flow between different means/components in an example apparatus 1402. The apparatus 1402 may be a base station or a component of a base station. The apparatus 1402 includes a reception component 1404, a transmission component 1406, a first indication transmission component 1408, a second indication transmission component 1410, and a communication transmission component 1412.

The reception component 1404 of the apparatus 1402 may be configured to receive uplink communications from a UE, such as an example UE 1450. The transmission component 1406 of the apparatus 1402 may be configured to transmit downlink communication to the UE 1450 (e.g., as described in connection with 1302, 1304, 1306). The identification component 1408 of the apparatus 1402 may be configured to identify a conflict between a resource for communication with the UE 1450 (e.g., as described in connection with 1302) and a WUS resource for another UE. The second indication transmission component 1410 of the apparatus 1402 may be configured to transmit a second communication regarding modification of communication (e.g., as described in connection with 1304). The communication transmission component 1412 of the apparatus 1402 may be configured to transmit the communication in a resource associated with the UE 1450 (e.g., as described in connection with 1306), e.g., as modified based on the identification of the conflict.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
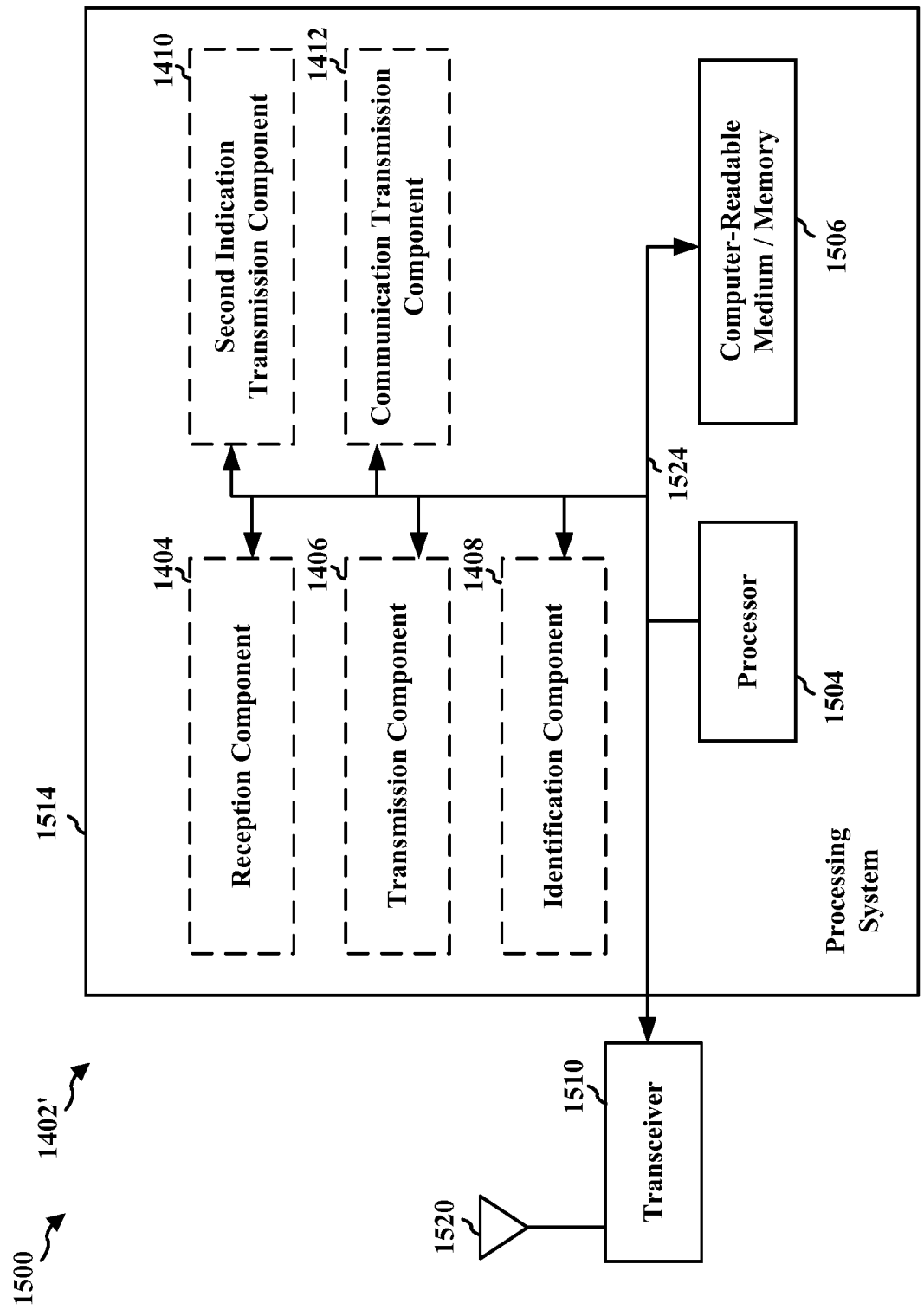
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1406, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412. The components may be software components running in the processor 1504, resident/stored in the computer readable medium/memory 1506, one or more hardware components coupled to the processor 1504, or some combination thereof. The processing system 1514 may be a component of the base station 310 and may include the memory 376 and/or at least one of the TX processor 316, the RX processor 370, and the controller/processor 375. Alternatively, the processing system 1514 may be the entire base station (e.g., see 310 of FIG. 3).

In one configuration, the apparatus 1402/1402' for wireless communication includes means for identifying a conflict between a resource for communication with a first UE and a WUS resource for another UE. The apparatus 1402/1402' also includes means for modifying communication with the first UE in response to identifying the conflict. The apparatus 1402/1402' also includes means for transmitting, prior to the WUS resource, a second indication of whether the base station punctures or rate-matches the communication. The apparatus 1402/1402' also includes means for providing the second indication through DCI. The apparatus 1402/1402' also includes means for transmitting, prior to the WUS resource, a schedule of one or more resources, and where the communication may be modified based on the schedule and the one or more resources.

The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 16:
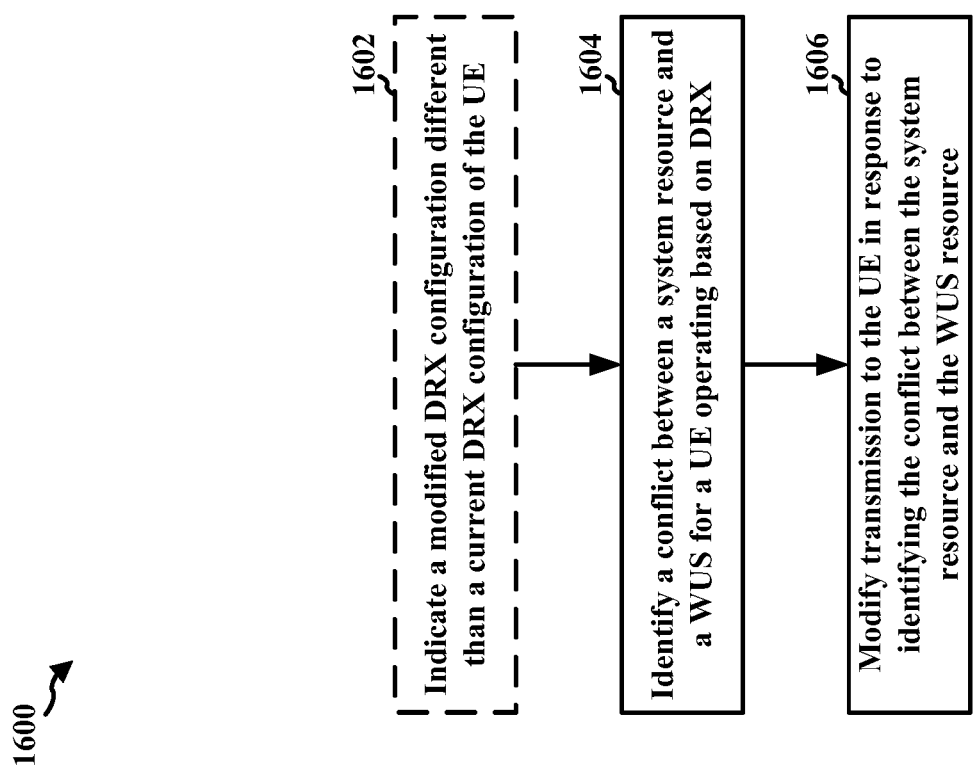
FIG. 16 is a flowchart of a method of wireless communication.

FIG. 16 is a flowchart 1600 of a method of wireless communication. The method may be performed by a base station (e.g., the base station 102, 180, 310, 402, 502; the apparatus 1402/1402'; the processing system 1514, which may include the memory 376 and which may be the entire base station 310 or a component of the base station 310, such as the TX processor 316, the RX processor 370, and/or the controller/processor 375). Optional aspects are illustrated with a dashed line. The method of FIG. 16 facilitates enabling a UE to adjust reception of WUSs in order to accommodate for collisions with system resources, as disclosed herein.

At 1604, the base station identifies a conflict between a system resource and a WUS resource for a UE operating based on DRX. In some examples, the system resource may be one of an SSB, a PBCH block, a first broadcast signal including a SIB, a second broadcast signal including RMSI, a third broadcast signal including OSI, a group-specific reference signal, and/or a statically-reserved resource. The conflict may be identified based on an overlap in time between the WUS resource and the system resource.

At 1606, the base station modifies a transmission to the UE in response to identifying the conflict between the system resource and the WUS resource, as described in connection with FIG. 5. The modification may be performed, for example, by a WUS resource component 1710, the modified DRX configuration component 1708, and/or the transmission component 1706 of the apparatus 1702. In some examples, the WUS resource may be in conflict with a system resource and transmission of the WUS may be modified in response to the conflict. In some examples, the base station may modify the transmission to the UE by transmitting a communication to the UE during a DRX-On duration based on at least one of a default DRX-On duration, a default DRX cycle duration, a default inactivity timer, or a default periodicity in response to identifying the conflict between the system resource and the WUS resource.

As illustrated at 1602, the base station may indicate, to a UE, a modified DRX configuration, e.g., a DRX configuration that is different than a current DRX configuration of the UE, as described in connection with the modified DRX configurations 540 of FIG. 5. Then, the modification of the transmission, at 1606 may include transmitting the WUS to the UE on an adjusted WUS resource based on the modified DRX configuration. The transmitting of the modified DRX configuration may be performed, for example, by a modified DRX configuration component 1708 and/or a transmission component 1706 of the apparatus 1702 of FIG. 17. In some examples, the modified DRX configuration may include a modified DRX cycle duration. In some examples, the modified DRX configuration may include a modified DRX-On duration.

In some examples, a WUS may include a payload. In some such examples, the payload may include at least one of a DRX-On duration parameter associated with the DRX state, a DRX cycle duration parameter associated with a duration of a DRX cycle, an inactivity timer parameter associated with the DRX state, or a periodicity parameter associated with the DRX cycle. In some examples, the base station may modify the transmission to the UE by transmitting a communication to the UE during a DRX-On based on at least one parameter from a payload of a previous WUS in response to identifying the conflict between the system resource and the WUS resource, the at least parameter comprising one or more of a DRX-On duration, a DRX cycle duration, a inactivity timer, or a periodicity.

In some examples, modifying the transmission may include indicating a modified DRX configuration transmitted to the UE (e.g., at 1602). For example, the base station may transmit the WUS prior to the system resource.

Figure 17:
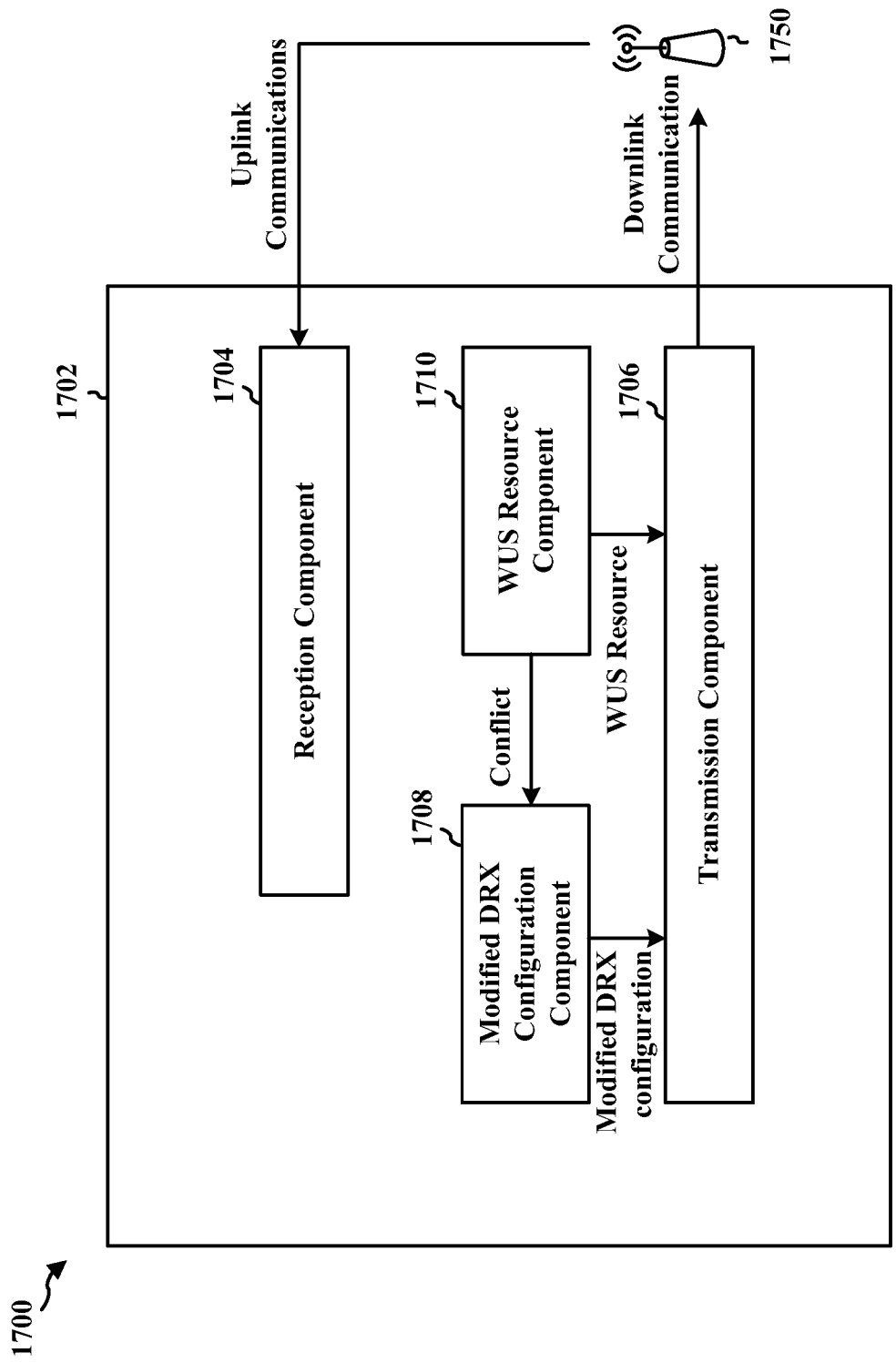
FIG. 17 is a conceptual data flow diagram illustrating the data flow between different means/components in an example apparatus.

FIG. 17 is a conceptual data flow diagram 1700 illustrating the data flow between different means/components in an example apparatus 1702. The apparatus 1702 may be a base station or a component of a base station. The apparatus 1702 includes a reception component 1704, a transmission component 1706, a modified DRX configuration component 1708, and a WUS resource component 1710.

The reception component 1704 of the apparatus 1702 may be configured to receive uplink communications from a UE, such as an example UE 1750. The transmission component 1706 of the apparatus 1702 may be configured to transmit downlink communication to a UE, such as the example UE 1750 (e.g., as described in connection with 1602, 1606). The WUS resource component 1710 may be configured to identify a conflict between a system resource and a WUS resource for a UE, e.g., as described in connection with 1604. Modified DRX configuration component 1708 of the apparatus 1702 may be configured to modify a transmission to the UE 1750 in response to identifying the conflict between the system resource and the WUS resource (e.g., as described in connection with 1606). The transmission component 1706 of the apparatus 1702 may be configured to transmit a WUS to a UE, such as the UE 1750.

The apparatus may include additional components that perform each of the blocks of the algorithm in the aforementioned flowchart of FIG. 16. As such, each block in the aforementioned flowchart of FIG. 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
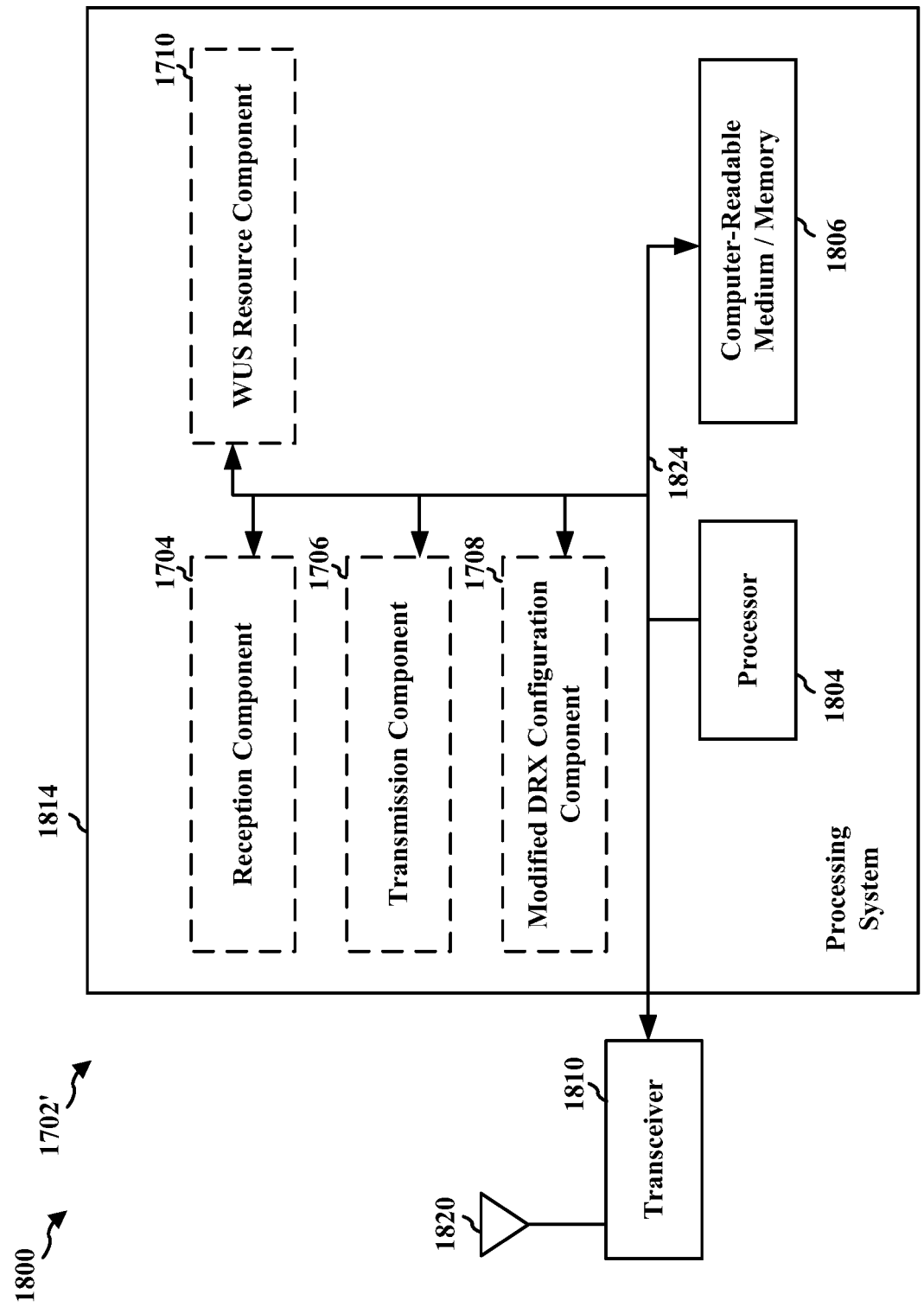
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1706, 1708, 1710, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704. In addition, the transceiver 1810 receives information from the processing system 1814, specifically the transmission component 1706, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1704, 1706, 1708, 1710. The components may be software components running in the processor 1804, resident/stored in the computer readable medium/memory 1806, one or more hardware components coupled to the processor 1804, or some combination thereof. The processing system 1814 may be a component of the base station 310 and may include the memory 376 and/or at least one of the TX processor 316, the RX processor 370, and the controller/processor 375. Alternatively, the processing system 1814 may be the entire base station (e.g., see 310 of FIG. 3).

In one configuration, the apparatus 1702/1702' for wireless communication includes means for identifying a conflict between a system resource and a WUS resource for a UE operating based on DRX, e.g., as described in connection with 1604 in FIG. 16. The apparatus 1702/1702' may also include means for modifying a transmission to the UE in response to identifying the conflict between the system resource and the WUS resource, e.g., as described in connection with 1606 in FIG. 16. The apparatus 1702/1702' may also include means for indicating, to the UE, a modified DRX configuration different than a DRX configuration associated with the DRX state of the UE, e.g., as described in connection with 1602 in FIG. 16. The apparatus 1702/1702' may include means for transmitting to the UE on an adjusted WUS resource based on the modified DRX configuration. The apparatus 1702/1702' may also include means for transmitting the WUS resource at a non-overlapping location with respect to the system resource.

The aforementioned means may be one or more of the aforementioned components of the apparatus 1702 and/or the processing system 1814 of the apparatus 1702' configured to perform the functions recited by the aforementioned means. As described supra, the processing system 1814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Example 1 is a method of wireless communication at a User Equipment (UE), comprising: receiving a first indication of a Wake-Up Signal (WUS) resource for another UE; identifying a conflict between a resource allocated to the UE and the WUS resource for the other UE based on the first indication; and modifying communication with a base station in the resource in response to identifying the conflict.

In Example 2, the method further includes that the resource is for a downlink data transmission or a downlink control transmission.

In Example 3, the method of Example 1 or Example 2 further includes that modifying the communication in the resource includes puncturing reception of the communication that overlaps with the WUS resource.

In Example 4, the method of any of Examples 1-3 further includes that modifying the communication in the resource includes rate-matching around the WUS resource.

In Example 5, the method of any of Examples 1-4 further includes that the first indication is comprised in a rate-matching resource configuration parameter.

In Example 6, the method of any of Examples 1-5 further includes receiving, prior to the WUS resource, a second indication of whether to puncture reception of the communication or to rate-match around the WUS resource, and wherein modifying communication includes puncturing or rate matching the communication based on the second indication.

In Example 7, the method of any of Examples 1-6 further includes that the second indication is received in downlink control information (DCI).

In Example 8, the method of any of Examples 1-7 further includes receiving, prior to the WUS resource, a schedule of one or more resources that at least partially overlap the WUS resource, wherein modifying the communication in the resource includes receiving the communication based on the schedule.

In Example 9, the method of any of Examples 1-8 further includes that modifying the communication further includes puncturing reception of the communication based on the schedule.

In Example 10, the method of any of Examples 1-9 further includes that modifying the communication further includes rate-matching around a respective resource based on the schedule.

In Example 11, the method of any of Examples 1-10 further includes that the schedule indicates shifted locations in at least one of time or frequency for the communication based on the conflict between the one or more resources and the WUS resource, and wherein the modifying the communication includes monitoring for the communication at the shifted location.

In Example 12, the method of any of Examples 1-11 further includes that the communication comprises a downlink reference signal.

In Example 13, the method of any of Examples 1-12 further includes that the downlink reference signal includes one of a channel state information reference signal (CSI-RS), a phase tracking reference signal (PTRS), a tracking reference signal, and a demodulation reference signal (DMRS).

In Example 14, the method of any of Examples 1-13 further includes that modifying the communication includes receiving the downlink reference signal using puncturing on the WUS resource or rate matching around the WUS resource.

In Example 15, the method of any of Examples 1-14 further includes receiving a second indication of a shifted location of the downlink reference signal, wherein modifying the communication includes monitoring for the downlink reference signal at the shifted location.

In Example 16, the method of any of Examples 1-15 further includes receiving a second indication indicating whether to modify reception of the downlink reference signal based on puncturing, rate matching, or monitoring a shifted location, wherein the UE modifies reception of the downlink reference signal based on the second indication.

In Example 17, the method of any of Examples 1-16 further includes that the resource is for an uplink data transmission or an uplink control transmission, and wherein the UE identifies the conflict is between the WUS resource for the other UE and the uplink data transmission or the uplink control transmission.

Example 18 is a device including one or more processors and one or more memories in electronic communication with the one or more processors storing instructions executable by the one or more processors to cause a system or an apparatus to implement a method as in any of Examples 1 to 17.

Example 19 is a system or apparatus including means for implementing a method or realizing an apparatus as in any of Examples 1 to 17.

Example 20 is a non-transitory computer-readable medium storing instructions executable by one or more processors to cause the one or more processors to implement a method as in any of Examples 1 to 17.

Example 21 is a method for wireless communication at a User Equipment (UE), comprising: identifying a conflict between a system resource and a wake-up signal (WUS) resource associated with the UE while the UE is operating based on discontinuous reception (DRX); and modifying DRX operation in response to identifying the conflict between the system resource and the WUS resource.

In Example 22, the method of Example 21 further includes that the system resource includes one of a synchronization signal block (SSB), a physical broadcast channel (PBCH) block, a first broadcast signal including a system information block (SIB), a second broadcast signal including Remaining Minimum System Information (RMSI), a third broadcast signal including Other System Information (OSI), a group-specific reference signal, and a statically-reserved resource.

In Example 23, the method of Example 21 or Example 22 further includes that the conflict is identified based on an overlap in time between the WUS resource and the system resource.

In Example 24, the method of any of Examples 21-23 further includes that modifying the DRX operation includes refraining from monitoring for a WUS in the WUS resource that conflicts with the system resource.

In Example 25, the method of any of Examples 21-24 further includes that waking up during a DRX-On duration following the WUS resource without monitoring for the WUS.

In Example 26, the method of any of Examples 21-25 further includes that modifying the DRX operation includes applying at least one of a default DRX-On duration, a default DRX cycle duration, a default inactivity timer, or a default periodicity in response to identifying the conflict between the system resource and the WUS resource.

In Example 27, the method of any of Examples 21-26 further includes that waking up during a DRX-On duration without monitoring the WUS resource that conflicts with the system resource, wherein the UE wakes up based on the at least one of the default DRX-On duration, the default DRX cycle duration, the default inactivity timer, or the default periodicity.

In Example 28, the method of any of Examples 21-27 further includes that modifying the DRX operation includes applying at least one parameter from a payload of a previous WUS in response to identifying the conflict between the system resource and the WUS resource, the at least parameter comprising one or more of a DRX-On duration, a DRX cycle duration, an inactivity timer, or a periodicity.

In Example 29, the method of any of Examples 21-28 further includes receiving a modified DRX configuration, wherein modifying the DRX operation includes monitoring an adjusted WUS resource based on the modified DRX configuration in response to identifying the conflict between the system resource and the WUS resource.

In Example 30, the method of any of Examples 21-29 further includes that the modified DRX configuration includes a modified DRX cycle duration.

In Example 31, the method of any of Examples 21-30 further includes that the modified DRX configuration includes a modified DRX-On duration.

In Example 32, the method of any of Examples 21-31 further includes that the monitoring the adjusted WUS resource based on the modified DRX configuration includes: monitoring for a WUS at a non-overlapping location with respect to the system resource; and waking up prior to the system resource.

In Example 33, the method of any of Examples 21-32 further includes that monitoring the adjusted WUS resource based on the modified DRX configuration includes: monitoring for a WUS at a non-overlapping location with respect to the system resource; and waking up after the system resource.

Example 34 is a device including one or more processors and one or more memories in electronic communication with the one or more processors storing instructions executable by the one or more processors to cause a system or an apparatus to implement a method as in any of Examples 21-33.

Example 35 is a system or apparatus including means for implementing a method or realizing an apparatus as in any of Examples 21-33.

Example 36 is a non-transitory computer-readable medium storing instructions executable by one or more processors to cause the one or more processors to implement a method as in any of Examples 21-33.

Example 37 is a method of wireless communication at a base station, comprising: identifying a conflict between a resource for communication with a first UE and a Wake-Up Signal (WUS) resource for another UE; and modifying the communication with the first UE in the resource in response to identifying the conflict.

In Example 38, the method of Example 37 further includes that the resource is for a downlink data transmission to the first UE or a downlink control transmission to the first UE.

In Example 39, the method of Example 37 or Example 38 further includes that modifying the communication includes puncturing the downlink data transmission or the downlink control transmission in the resource.

In Example 40, the method of any of Examples 37-39 further includes that modifying the communication includes rate-matching around the resource.

In Example 41, the method of any of Examples 37-40 further includes that the first indication is comprised in a rate-matching resource configuration parameter.

In Example 42, the method of any of Examples 37-41 further includes transmitting, prior to the WUS resource, a second indication to puncture reception of the communication or to rate-match around the resource, and wherein of the base station modifies the communication by puncturing the communication or rate matching around the resource in accordance with the second indication.

In Example 43, the method of any of Examples 37-42 further includes that the second indication is transmitted in downlink control information (DCI).

In Example 44, the method of any of Examples 37-43 further includes that transmitting, prior to the WUS resource, a schedule of one or more resources, wherein modifying the communication includes transmitting the communication based on the schedule.

In Example 45, the method of any of Examples 37-44 further includes that the communication comprises a downlink reference signal.

In Example 46, the method of any of Examples 37-45 further includes that the downlink reference signal includes one of a channel state information reference signal (CSI-RS), a phase tracking reference signal (PTRS), a tracking reference signal, and a demodulation reference signal (DMRS).

In Example 47, the method of any of Examples 37-46 further includes that the communication comprises an uplink data transmission or an uplink control transmission, and wherein the base station identifies the conflict between the WUS resource for the second UE and the uplink data transmission or the uplink control transmission from the first UE.

Example 48 is a device including one or more processors and one or more memories in electronic communication with the one or more processors storing instructions executable by the one or more processors to cause a system or an apparatus to implement a method as in any of Examples 37-47.

Example 49 is a system or apparatus including means for implementing a method or realizing an apparatus as in any of Examples 37-47.

Example 50 is a non-transitory computer-readable medium storing instructions executable by one or more processors to cause the one or more processors to implement a method as in any of Examples 37-47.

Example 51 is a method for wireless communication at a base station, comprising: identifying a conflict between a system resource and a wake-up signal (WUS) resource for a user equipment (UE) operating based on discontinuous reception (DRX); and modifying a transmission to the UE in response to identifying the conflict between the system resource and the WUS resource.

In Example 52, the method of Example 51 further includes that the system resource includes one of a synchronization signal block (SSB), a physical broadcast channel (PBCH) block, a first broadcast signal including a system information block (SIB), a second broadcast signal including Remaining Minimum System Information (RMSI), a third broadcast signal including Other System Information (OSI), a group-specific reference signal, and a statically-reserved resource.

In Example 53, the method of Example 51 or Example 52 further includes that the conflict is identified based on an overlap in time between the WUS resource and the system resource.

In Example 54, the method of any of Examples 51-53 further includes that modifying the transmission to the UE includes transmitting a communication to the UE during a DRX-On duration based at least one of a default DRX-On duration, a default DRX cycle duration, a default inactivity timer, or a default periodicity in response to identifying the conflict between the system resource and the WUS resource.

In Example 55, the method of any of Examples 51-54 further includes that modifying the DRX transmission to the UE includes transmitting a communication to the UE during a DRX-On based on at least one parameter from a payload of a previous WUS in response to identifying the conflict between the system resource and the WUS resource, the at least parameter comprising one or more of a DRX-On duration, a DRX cycle duration, a inactivity timer, or a periodicity.

In Example 56, the method of any of Examples 51-55 further includes indicating a modified DRX configuration to the UE, wherein modifying the transmission to the UE includes transmitting a WUS to the UE on an adjusted WUS resource based on the modified DRX configuration.

In Example 57, the method of any of Examples 51-56 further includes that the modified DRX configuration includes at least one of a modified DRX cycle duration or a modified DRX-On duration.

Example 58 is a device including one or more processors and one or more memories in electronic communication with the one or more processors storing instructions executable by the one or more processors to cause a system or an apparatus to implement a method as in any of Examples 51-57.

Example 59 is a system or apparatus including means for implementing a method or realizing an apparatus as in any of Examples 51-57.

Example 60 is a non-transitory computer-readable medium storing instructions executable by one or more processors to cause the one or more processors to implement a method as in any of Examples 51-57.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
   receiving a first indication of a Wake-Up Signal (WUS) resource for a second UE;
   receiving, prior to the WUS resource, a second indication indicating at least one of whether to puncture reception of a communication, whether to rate-match around the WUS resource, or a schedule of one or more resources that at least partially overlap the WUS resource;
   identifying a conflict between a resource allocated to the UE and the WUS resource for the second UE based on the first indication; and
   modifying the communication with a base station in the resource based on the second indication and in response to identifying the conflict.

2. The method of claim 1, wherein the resource is for a downlink data transmission or a downlink control transmission.

3. The method of claim 2, wherein modifying the communication in the resource includes puncturing the reception of the communication that overlaps with the WUS resource.

4. The method of claim 2, wherein modifying the communication in the resource includes rate-matching around the WUS resource.

5. The method of claim 4, wherein the first indication is comprised in a rate-matching resource configuration parameter.

6. The method of claim 2, wherein modifying the communication includes puncturing the reception of the communication or rate-matching the communication based on the second indication.

7. The method of claim 6, wherein the second indication is received in downlink control information (DCI).

8. The method of claim 2, wherein modifying the communication in the resource includes receiving the communication based on the schedule.

9. The method of claim 8, wherein modifying the communication further includes puncturing the reception of the communication based on the schedule.

10. The method of claim 8, wherein modifying the communication further includes rate-matching around a respective resource based on the schedule.

11. The method of claim 8, wherein the schedule indicates shifted locations in at least one of time or frequency for the communication based on the conflict between the one or more resources and the WUS resource, and
   wherein modifying the communication includes monitoring for the communication at the shifted locations.

12. The method of claim 1, wherein the communication comprises a downlink reference signal.

13. The method of claim 12, wherein the downlink reference signal includes one of a channel state information reference signal (CSI-RS), a phase tracking reference signal (PTRS), a tracking reference signal, and a demodulation reference signal (DMRS).

14. The method of claim 13, wherein modifying the communication includes receiving the downlink reference signal using puncturing on the WUS resource or rate-matching around the WUS resource.

15. The method of claim 13, wherein the schedule indicates a shifted location of the downlink reference signal, and
   wherein modifying the communication includes monitoring for the downlink reference signal at the shifted location.

16. The method of claim 13, wherein modifying reception of the downlink reference signal is based on the second indication.

17. The method of claim 1, wherein the resource is for an uplink data transmission or an uplink control transmission, and
   wherein identifying the conflict includes identifying that the conflict is between the WUS resource for the second UE and the uplink data transmission or the uplink control transmission.

18. An apparatus for wireless communication at a User Equipment (UE), comprising:
   a memory; and
   at least one processor coupled to the memory and configured to:
      receive a first indication of a Wake-Up Signal (WUS) resource for a second UE;
      receive, prior to the WUS resource, a second indication indicating at least one of whether to puncture reception of a communication, whether to rate-match around the WUS resource, or a schedule of one or more resources that partially overlap the WUS resource;
      identify a conflict between a resource allocated to the UE and the WUS resource for the second UE based on the first indication; and
      modify the communication with a base station in the resource based on the second indication and in response to identifying the conflict.

19. A method of wireless communication at a base station, comprising:
   identifying a conflict between a resource for communication with a first User Equipment (UE) and a Wake-Up Signal (WUS) resource for a second UE;
   transmitting, prior to the WUS resource, an indication indicating at least one of whether to puncture reception of the communication, whether to rate-match around the WUS resource, or a schedule of one or more resources that at least partially overlap the WUS resource; and
   modifying the communication with the first UE in the resource based on the indication and in response to identifying the conflict.

20. The method of claim 19, wherein the resource is for a downlink data transmission to the first UE or a downlink control transmission to the first UE.

21. The method of claim 20, wherein modifying the communication includes puncturing the downlink data transmission or the downlink control transmission in the resource.

22. The method of claim 20, wherein modifying the communication includes rate-matching around the resource.

23. The method of claim 22, wherein the base station indicates the conflict to the first UE in a rate-matching resource configuration parameter.

24. The method of claim 20, wherein modifying the communication includes puncturing the communication or rate-matching around the resource in accordance with the indication.

25. The method of claim 24, wherein the indication is transmitted in downlink control information (DCI).

26. The method of claim 20, wherein modifying the communication includes transmitting the communication based on the schedule.

27. The method of claim 19, wherein the communication comprises a downlink reference signal.

28. The method of claim 27, wherein the downlink reference signal includes one of a channel state information reference signal (CSI-RS), a phase tracking reference signal (PTRS), a tracking reference signal, and a demodulation reference signal (DMRS).

29. The method of claim 19, wherein the communication comprises an uplink data transmission or an uplink control transmission, and
   wherein identifying the conflict includes identifying that the conflict is between the WUS resource for the second UE and the uplink data transmission or the uplink control transmission from the first UE.

30. An apparatus for wireless communication at a base station, comprising:
   a memory; and
   at least one processor coupled to the memory and configured to:
      identify a conflict between a resource for communication with a first User Equipment (UE) and a Wake-Up Signal (WUS) resource for a second UE;
      transmit, prior to the WUS resource, an indication indicating at least one of whether to puncture reception of the communication, whether to rate-match around the WUS resource, or a schedule of one or more resources that at least partially overlap the WUS resource; and
      modify the communication with the first UE in the resource based on the indication and in response to identifying the conflict.

\* \* \* \* \*